US011673488B2

(12) United States Patent
Kawahira et al.

(10) Patent No.: US 11,673,488 B2
(45) Date of Patent: Jun. 13, 2023

(54) SITTING SENSOR

(71) Applicant: Fujikura Ltd., Tokyo (JP)

(72) Inventors: Tetsuya Kawahira, Tokyo (JP); Eriko Hayashi, Tokyo (JP)

(73) Assignee: FUJIKURA LTD., Tokyo (JP)

( * ) Notice: Subject to any disclaimer, the term of this patent is extended or adjusted under 35 U.S.C. 154(b) by 377 days.

(21) Appl. No.: 17/046,076

(22) PCT Filed: Apr. 10, 2019

(86) PCT No.: PCT/JP2019/015686
§ 371 (c)(1),
(2) Date: Oct. 8, 2020

(87) PCT Pub. No.: WO2019/198773
PCT Pub. Date: Oct. 17, 2019

(65) Prior Publication Data
US 2021/0170914 A1 Jun. 10, 2021

(30) Foreign Application Priority Data

Apr. 12, 2018 (JP) .............................. JP2018-076873

(51) Int. Cl.
*B60N 2/00* (2006.01)
*H01H 13/16* (2006.01)
(52) U.S. Cl.
CPC ............ *B60N 2/002* (2013.01); *H01H 13/16* (2013.01)
(58) Field of Classification Search
CPC .. B60N 2/56; B60N 2205/00; B60N 2205/30; B60N 2/00; B60N 2/002; G01G 19/08;
(Continued)

(56) References Cited

U.S. PATENT DOCUMENTS

2006/0278513 A1* 12/2006 Kawahira ............. B60R 21/015
200/512

FOREIGN PATENT DOCUMENTS

| CN | 102405505 A | 4/2012 |
| EP | 1636071 A1 | 3/2006 |

(Continued)

OTHER PUBLICATIONS

International Search Report dated Jul. 2, 2019, issued in counterpart International Application No. PCT/JP2019/015686. (1 page).

*Primary Examiner* — Anthony R Jimenez
(74) *Attorney, Agent, or Firm* — WHDA, LLP

(57) ABSTRACT

A plurality of pressure-sensitive switches of a sitting sensor (1) has a first pressure-sensitive switch group including a first pressure-sensitive switch (SW11) including a first specific pressure-sensitive switch and a second pressure-sensitive switch (SW21), and a second pressure-sensitive switch group including first pressure-sensitive switches (SW11, SW12) including the first specific pressure-sensitive switch, and a second pressure-sensitive switch (SW22), in which in the first pressure-sensitive switch group, the first pressure-sensitive switch (SW11) and the second pressure-sensitive switch (SW21) are disposed adjacent to each other along a left-right direction of a seat (SE), in the second pressure-sensitive switch group, the first pressure-sensitive switches (SW11, SW12) and the second pressure-sensitive switch (SW22) are disposed adjacent to each other along a front-rear direction of the seat (SE), and turning on the first pressure-sensitive switch and the second pressure-sensitive switch causes a current to flow between a pair of terminals (T1, T2).

14 Claims, 11 Drawing Sheets

(58) Field of Classification Search
CPC ............... G01G 19/12; H01H 2209/00; H01H 2209/002; H01H 2221/00; H01H 2221/002; H01H 2221/006; H01H 23/00; H01H 23/008; H01H 3/00; H01H 3/0213; H01H 3/12; H01H 3/70; H01H 3/7006; H01H 3/7013; H01H 3/702; H01H 2239/00; H01H 2239/006; H01H 13/00; H01H 13/16; H01H 13/50; H01H 13/70; H01H 13/7006; H01H 13/7013; H01H 13/702; H01H 13/703; H01H 13/705; H01H 35/26; H01H 35/2607; H01H 35/2628; H01H 2205/032; H01H 2205/038; H01H 2207/026; B60W 2420/42
USPC ......................................................... 340/667
See application file for complete search history.

(56) References Cited

FOREIGN PATENT DOCUMENTS

| | | |
|---|---|---|
| EP | 2437275 A1 | 4/2012 |
| JP | 1-79229 U | 5/1989 |
| JP | 2010-175312 A | 8/2010 |
| JP | 2012-108113 A | 6/2012 |
| JP | 5526744 B2 | 6/2014 |
| JP | 2015-13613 A | 1/2015 |
| JP | 2017-109728 A | 6/2017 |
| WO | 2005/000637 A1 | 1/2005 |
| WO | 2015/005240 A1 | 1/2015 |

* cited by examiner

SITTING SENSOR

TECHNICAL FIELD

The present invention relates to a sitting sensor and is suitable for appropriately detecting sitting.

BACKGROUND ART

As one safety system in vehicles, an alarm system that warns of an unworn seat belt when an occupant is in a vehicle has been in practical use. This alarm system issues a warning when the seat belt being worn is not sensed while sitting of a person is sensed. As a device that detects such sitting of a person, a sitting sensor that detects sitting by application of a load may be used.

As such a sitting sensor, a sitting detection device of Patent Literature 1 has been proposed. The sitting detection device of Patent Literature 1 has a sheet-shaped upper film and lower film that are overlapped via an insulating spacer, and a plurality of contacts as pressure-sensitive switches linearly arranged with a predetermined space apart to form a rod shape. Further, the plurality of contacts of this sitting detection device has a configuration in which there is a set of the contacts disposed every other, and a sitting detection signal is output when one or more contacts in each set of contacts are turned on by application of a load of an occupant who sits on a seat cushion.

[Patent Literature 1] JP5526744 B2

SUMMARY OF INVENTION

In the sitting detection device of Patent Literature 1, as described above, the pressure-sensitive switches are linearly disposed with a predetermined space apart, and detects sitting when at least two contacts are turned on. Meanwhile, an occupant sits on a seat may shift the buttocks forward from a normal sitting position, which is a general way of sitting, and sit at a forward position, or may shift the buttocks rearward from the normal sitting position and sit at a rearward position. Thus, when the occupant sits at the forward position or at the rearward position, only one contact located at the farthest end may be turned on in the sitting detection device of Patent Literature 1. In this case, sitting cannot be detected.

An object of the present invention is therefore to provide a sitting sensor capable of appropriately detecting sitting.

In order to solve the above problems, the sitting sensor of the present invention includes a pair of insulating sheets, a spacer disposed between the pair of insulating sheets and having a plurality of openings, a plurality of pressure-sensitive switches including a pair of electrodes facing each other at the plurality of openings, and a pair of terminals, in which the plurality of pressure-sensitive switches is configured by at least one first pressure-sensitive switch including one first specific pressure-sensitive switch and at least two second pressure-sensitive switches, and has a first pressure-sensitive switch group including the at least one first pressure-sensitive switch including the first specific pressure-sensitive switch and the at least one second pressure-sensitive switch, and the second pressure-sensitive switch group including the at least one first pressure-sensitive switch including the first specific pressure-sensitive switch and the at least one second pressure-sensitive switch that is different from the second pressure-sensitive switch of the first pressure-sensitive switch group, in the first pressure-sensitive switch group, the first specific pressure-sensitive switch is located at an end of the first pressure-sensitive switch group, and the first pressure-sensitive switch and the second pressure-sensitive switch are adjacent to each other along a left-right direction of a seat, in the second pressure-sensitive switch group, the first specific pressure-sensitive switch is located at an end of the second pressure-sensitive switch group, and the first pressure-sensitive switch and the second pressure-sensitive switch are adjacent to each other along a front-rear direction of the seat, and turning on the at least one first pressure-sensitive switch and the at least one second pressure-sensitive switch causes a current to flow between the pair of terminals.

In this sitting sensor, which has one first specific pressure-sensitive switch, the first specific pressure-sensitive switch belongs to both the first pressure-sensitive switch group and the second pressure-sensitive switch group. In such a sitting sensor, the second pressure-sensitive switch group including at least one first pressure-sensitive switch and at least one second pressure-sensitive switch is disposed along the front-rear direction of the seat. Thus, the sitting can be appropriately detected when the applied load is dispersed in the front-rear direction of the seat. Further, in a case where the first specific pressure-sensitive switch of the second pressure-sensitive switch group is located at the most front, because the first pressure-sensitive switch group including at least one first pressure-sensitive switch and at least one second pressure-sensitive switch is disposed along the left-right direction of the seat, for example, even when the occupant sits at the forward position as described above, the first pressure-sensitive switch and the second pressure-sensitive switch of the first pressure-sensitive switch group can simultaneously turned on. In contrast, in a case where the first specific pressure-sensitive switch of the second pressure-sensitive switch group is located at a rearmost position, because the first pressure-sensitive switch group including at least one first pressure-sensitive switch and at least one second pressure-sensitive switch are located along the left-right direction of the seat, for example, even when the occupant shifts the buttocks rearward from the normal sitting position and sits at the rearward position, the first pressure-sensitive switch and the second pressure-sensitive switch of the first pressure-sensitive switch group can be simultaneously turned on. Thus, the sitting sensor of the present invention can detect sitting more appropriately than the sitting detection device disclosed in Patent Literature 1. The front-rear direction of the seat is a direction within 30 degrees from a central line in a width direction of the seat, and the left-right direction of the seat is a direction within 30 degrees from a line perpendicular to the central line in the width direction of the seat.

Further, the pair of insulating sheets preferably has a first belt that overlaps all the pressure-sensitive switches of the first pressure-sensitive switch group and extends along the left-right direction of the seat, and a second belt that overlaps all the pressure-sensitive switches of the second pressure-sensitive switch group and extends along the front-rear direction of the seat.

With this configuration, even when a stress is applied to the sitting sensor in such a direction that the plurality of pressure-sensitive switches of the first pressure-sensitive switch group is separated from each other due to the sitting, the first belt, which extends along the left-right direction of the seat, prevents the plurality of pressure-sensitive switches of the first pressure-sensitive switch group from being separated from each other. Further, even when a stress is applied to the sitting sensor in such a direction that the plurality of pressure-sensitive switches of the second pressure-sensitive switch group is separated from each other due to the sitting, the second belt, which extends along the front-rear direction of the seat, prevents the plurality of pressure-sensitive switches of the second pressure-sensitive switch group from being separated from each other. This suppresses a relative displacement of the pressure-sensitive switches.

In this case, preferably, the sitting sensor includes a first wiring connected to at least one of the pressure-sensitive switches of the first pressure-sensitive switch group and disposed between the pair of insulating sheets on the first belt, and a second wiring connected to at least one of the pressure-sensitive switches of the second pressure-sensitive switch group and disposed between the pair of insulating sheets on the second belt, in which, of the pressure-sensitive switches of the second pressure-sensitive switch group, the first pressure-sensitive switch and the second pressure-sensitive switch are disposed to be displaced from each other in the left-right direction of the seat, and the second wiring is disposed between a first straight line extending in the front-rear direction of the seat through an end on a first side of the pressure-sensitive switch disposed to be displaced farthest to the first side in the left-right direction of the seat in the second pressure-sensitive switch group, and a second straight line that passes an end on a second side of the pressure-sensitive switch disposed to be displaced farthest to the second side in the left-right direction of the seat in the second pressure-sensitive switch group and is parallel to the first straight line.

If the pressure-sensitive switches of the second pressure-sensitive switch group are disposed in a row along the front-rear direction of the seat without a displacement in the left-right direction, for example, if the wiring connected to the first pressure-sensitive switch bypasses the second pressure-sensitive switch and extends, the wiring would have to rise in the left-right direction of the seat and extend along the second pressure-sensitive switch. However, in the sitting sensor having the above configuration, even when the second wiring connected to the pressure-sensitive switch that is displaced toward the first side in the left-right direction of the seat among the pressure-sensitive switches disposed along the front-rear direction of the seat bypasses the pressure-sensitive switch that is displaced toward the second side in the left-right direction of the seat, the second wiring can be linearly disposed. This can simplify a wiring design.

Further, the number of the pressure-sensitive switches of the second pressure-sensitive switch group is preferably larger than the number of the pressure-sensitive switches of the first pressure-sensitive switch group.

The occupant who sits on the seat generally tends to sit so as to be displaced in the front-rear direction of the seat rather than in the left-right direction of the seat. Therefore, because the number of pressure-sensitive switches of the second pressure-sensitive switch group is larger than the number of pressure-sensitive switches of the first pressure-sensitive switch group, even when the occupant sits to be displaced in the front-rear direction of the seat, the sitting can be detected more appropriately.

Preferably, in the first pressure-sensitive switch group, the pressure-sensitive switch located at an end opposite to the first specific pressure-sensitive switch is the second specific pressure-sensitive switch, and the plurality of pressure-sensitive switches further includes the third pressure-sensitive switch group in which the second specific pressure-sensitive switch is located at an end of the third pressure-sensitive switch group, the second specific pressure-sensitive switch is included on a side identical to a side where the second pressure-sensitive switch group is located with respect to the first specific pressure-sensitive switch, and in the sitting sensor, the at least one first pressure-sensitive switch and the at least one second pressure-sensitive switch are disposed adjacent to each other along the front-rear direction of the seat.

With such a configuration, the plurality of pressure-sensitive switches of the second pressure-sensitive switch group and the plurality of pressure-sensitive switches of the third pressure-sensitive switch group are disposed in parallel. This can further increase sitting detection sensitivity even when the occupant sits so as to be displaced in the left-right direction of the seat.

In this case, the second specific pressure-sensitive switch is preferably the second pressure-sensitive switch.

As mentioned above, the first specific pressure-sensitive switch is the first pressure-sensitive switch. Thus, of the pressure-sensitive switches of the second pressure-sensitive switch group and the pressure-sensitive switches of the third pressure-sensitive switch group, the first pressure-sensitive switch and the second pressure-sensitive switch can be easily disposed in the left-right direction of the seat. As a result, when the load is applied along the left-right direction of the seat, the first pressure-sensitive switch and the second pressure-sensitive switch are easily turned on, and the sitting detection sensitivity can be further increased.

Furthermore, in this case, a set of the one first pressure-sensitive switch of the second pressure-sensitive switch group and the one second pressure-sensitive switch of the third pressure-sensitive switch group preferably overlaps a straight line along the left-right direction of the seat, and the set of the one second pressure-sensitive switch of the second pressure-sensitive switch group and the one first pressure-sensitive switch of the third pressure-sensitive switch group preferably overlaps another straight line along the left-right direction of the seat.

In this case, when the load is applied along the left-right direction of the seat, the first pressure-sensitive switch and the second pressure-sensitive switch are more easily turned on, and the sitting detection sensitivity can be further increased. This includes a case where the set of the one first pressure-sensitive switch of the second pressure-sensitive switch group and the one second pressure-sensitive switch of the third pressure-sensitive switch group includes the first specific pressure-sensitive switch and the second specific pressure-sensitive switch.

Further, the pair of insulating sheets preferably has a first belt, a second belt that overlaps all the pressure-sensitive switches of the second pressure-sensitive switch group and extends along the front-rear direction of the seat, and a third belt that overlaps all the pressure-sensitive switches of the third pressure-sensitive switch group and extends along the front-rear direction of the seat, and the first belt preferably has a first end connected to the second belt, and a second end connected to the third belt.

With this configuration, even when a stress is applied to the sitting sensor in such a direction that the plurality of pressure-sensitive switches of the second pressure-sensitive switch group is separated from each other due to the sitting, the second belt, which extends along the front-rear direction of the seat, prevents the plurality of pressure-sensitive switches of the second pressure-sensitive switch group from being separated from each other. Further, even when a stress is applied to the sitting sensor in such a direction that the plurality of pressure-sensitive switches of the third pressure-sensitive switch group is separated from each other due to the sitting, the third belt, which extends along the front-rear direction of the seat, prevents the plurality of pressure-sensitive switches of the third pressure-sensitive switch group from being separated from each other. This can suppress a relative displacement of the pressure-sensitive switches.

In this case, the first belt preferably overlaps all the pressure-sensitive switches of the first pressure-sensitive switch group and extends along the left-right direction of the seat.

With this configuration, even when a stress is applied to the sitting sensor in such a direction that the plurality of pressure-sensitive switches of the first pressure-sensitive switch group is separated from each other due to the sitting, the first belt, which extends along the left-right direction of the seat, prevents the plurality of pressure-sensitive switches of the first pressure-sensitive switch group from being separated from each other. This can further suppress the relative displacement of the pressure-sensitive switches.

In this case, a distance between the second belt and the third belt is preferably larger than a width of the second belt and a width of the third belt.

With such a configuration, the distance between the second belt and the third belt is as large as or larger than one or more pressure-sensitive switch. This can prevent the pressure-sensitive switches on the second belt and the pressure-sensitive switches on the third belt from coming too close to each other, prevent the pressure-sensitive switches on the second belt and the pressure-sensitive switches on the third belt from being both turned on when a luggage is placed, and thus prevent the placed luggage from being erroneously detected. Further, for mass-production of the sitting sensor, a large number of the above insulating sheets are preferably imposed onto one insulating sheet. Thus, this configuration allows the sitting sensor to be imposed such that the second belt or the third belt of another insulating sheet is located between the second belt and the third belt of the insulating sheet. The above configuration makes the sitting sensor suitable for mass production.

Preferably, the sitting sensor further includes a first wiring disposed between the insulating sheets on the first belt, and connected to at least one of the pressure-sensitive switches of the first pressure-sensitive switch group, a second wiring disposed between the insulating sheets on the second belt, and connected to at least one of the pressure-sensitive switches of the second pressure-sensitive switch group, and a third wiring disposed between the insulating sheets on the third belt, and connected to at least one of the pressure-sensitive switches of the third pressure-sensitive switch group, in which of the pressure-sensitive switches of the second pressure-sensitive switch group, the first pressure-sensitive switch and the second pressure-sensitive switch are disposed to be displaced from each other in the left-right direction of the seat, of the pressure-sensitive switches of the third pressure-sensitive switch group, the first pressure-sensitive switch and the second pressure-sensitive switch are disposed to be displaced from each other in the left-right direction of the seat, the second wiring is disposed between a first straight line extending in the front-rear direction of the seat through an end on a first side of the pressure-sensitive switch disposed to be displaced farthest to the first side in the left-right direction of the seat in the second pressure-sensitive switch group, and a second straight line that passes an end on a second side of the pressure-sensitive switch disposed to be displaced farthest to the second side in the left-right direction of the seat in the second pressure-sensitive switch group and is parallel to the first straight line, and the third wiring is disposed between a third straight line extending in the front-rear direction of the seat through an end on a first side of the pressure-sensitive switch disposed to be displaced farthest to the first side in the left-right direction of the seat in the third pressure-sensitive switch group, and a fourth straight line that passes an end on a second side of the pressure-sensitive switch disposed to be displaced farthest to the second side in the left-right direction of the seat in the third pressure-sensitive switch group and is parallel to the third straight line.

If the pressure-sensitive switches of the second pressure-sensitive switch group are disposed in a row along the front-rear direction of the seat without a displacement in the left-right direction, for example, if the wiring connected to the first pressure-sensitive switch bypasses the second pressure-sensitive switch and extends, the wiring would have to rise in the left-right direction of the seat and extend along the second pressure-sensitive switch. Similarly, if the pressure-sensitive switches of the third pressure-sensitive switch group are disposed in a row along the front-rear direction of the seat without a displacement in the left-right direction, for example, if the wiring connected to the first pressure-sensitive switch bypasses the second pressure-sensitive switch and extends, the wiring would have to rise in the left-right direction of the seat and extend along the second pressure-sensitive switch. However, in the sitting sensor having the above configuration, even when the second wiring connected to the pressure-sensitive switch that is displaced toward the first side in the left-right direction of the seat among the pressure-sensitive switches of the second pressure-sensitive switch group bypasses the pressure-sensitive switch that is displaced toward the second side in the left-right direction of the seat, the second wiring can be linearly disposed. Similarly, the third wiring connected to the pressure-sensitive switch that is displaced toward the first side in the left-right direction of the seat among the pressure-sensitive switches of the third pressure-sensitive switch group bypasses the pressure-sensitive switch that is displaced toward the second side in the left-right direction of the seat, the third wiring can be linearly disposed. This can simplify a wiring design.

Further, at least one of the number of the pressure-sensitive switches of the second pressure-sensitive switch group or the number of the pressure-sensitive switches of the third pressure-sensitive switch group is preferably larger than the number of the pressure-sensitive switches of the first pressure-sensitive switch group.

As described above, the occupant who sits on the seat generally tends to sit so as to be displaced in the front-rear direction of the seat rather than in the left-right direction of the seat. Therefore, because the number of pressure-sensitive switches of the second pressure-sensitive switch group and the number of the pressure-sensitive switches of the third pressure-sensitive switch group are larger than the number of pressure-sensitive switches of the first pressure-sensitive switch group, even if the occupant sits to be displaced in the front-rear direction of the seat, the sitting can be detected more appropriately.

Further, the number of the pressure-sensitive switches of the first pressure-sensitive switch group may be two.

As described above, in the present invention, a sitting sensor capable of appropriately detecting sitting can be provided.

DESCRIPTION OF EMBODIMENTS

Hereinafter, preferred embodiments of a sitting sensor according to the present invention will be described in detail with reference to the drawings. Note that, for ease of understanding, scales of the respective drawings may differ from scales described below.

First Embodiment

Figure 1:
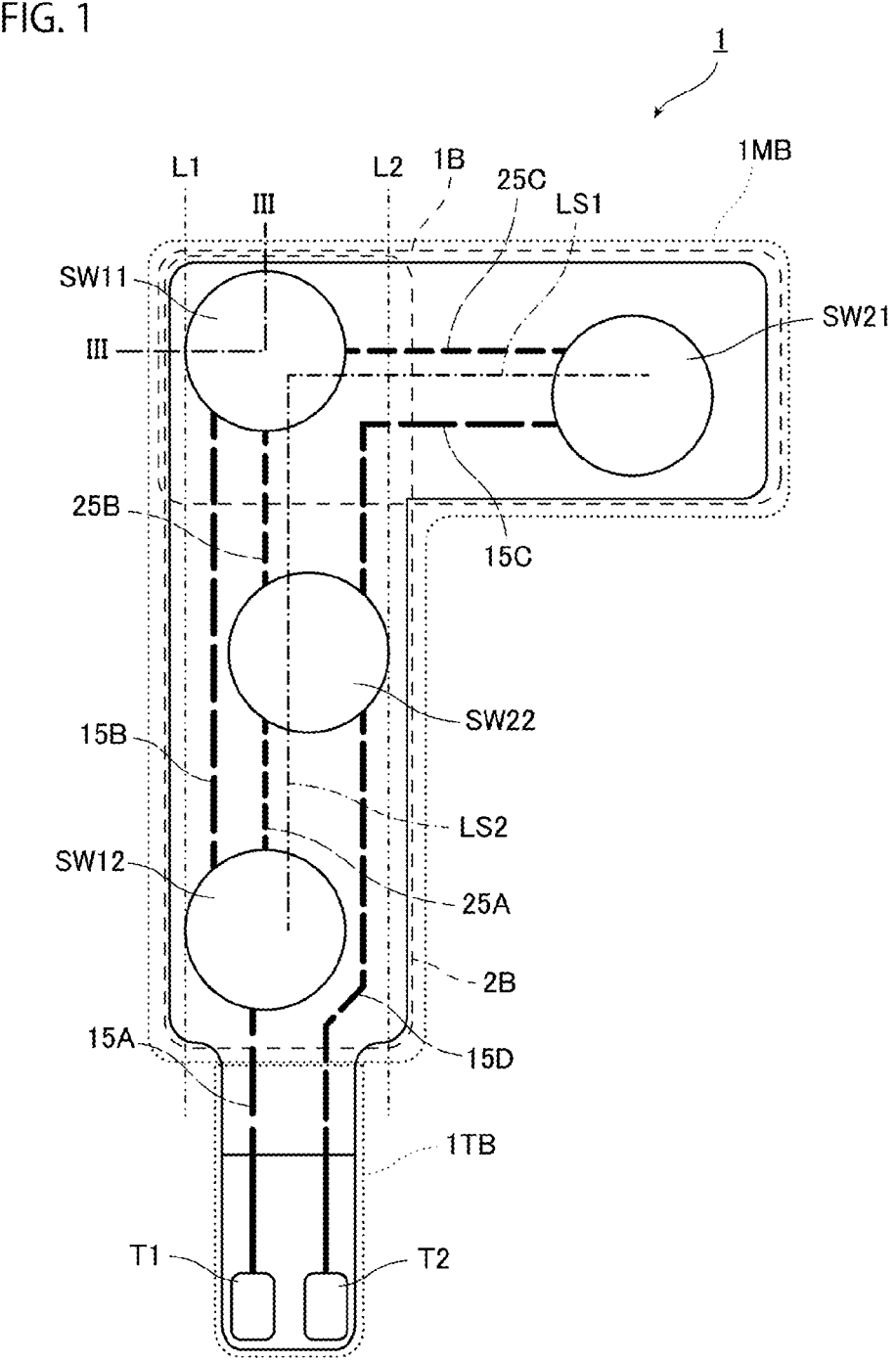
FIG. 1 is a plan view of a sitting sensor according to a first embodiment.
Figure 2:
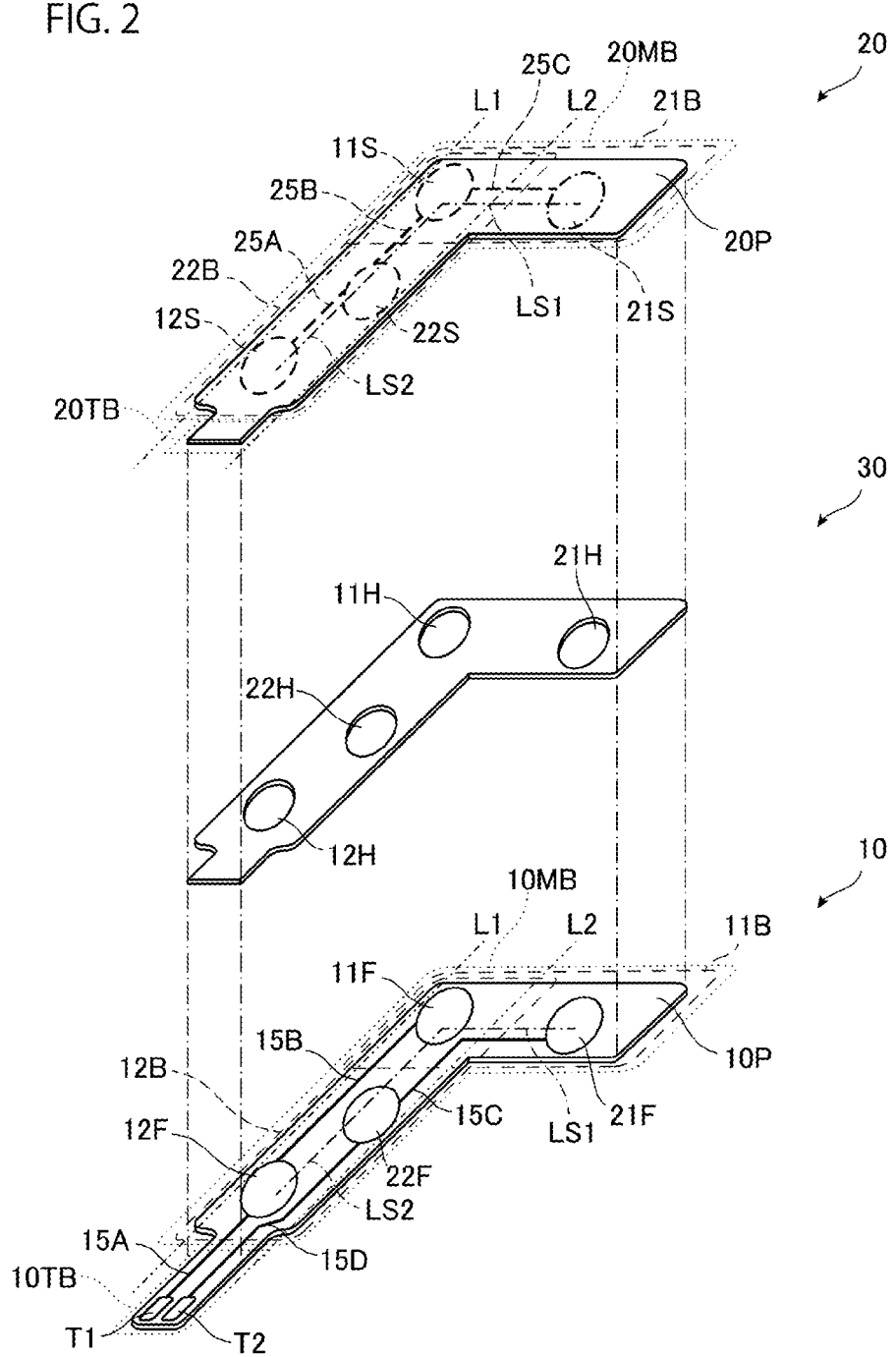
FIG. 2 is an exploded view of the sitting sensor in FIG. 1.

FIG. 1 is a plan view of the sitting sensor according to the present embodiment. Further, FIG. 2 is an exploded view of a sitting sensor 1 in FIG. 1. As shown in FIG. 2, the sitting sensor 1 includes a first electrode sheet 10, a second electrode sheet 20, and a spacer 30.

The first electrode sheet 10 as one electrode sheet includes a first insulating sheet 10P as one insulating sheet, first electrodes 11F and 12F, second electrodes 21F and 22F, terminals T1 and T2, and wirings 15A to 15D as main constituent elements.

The first insulating sheet 10P includes an insulating and flexible sheet. Examples of a material configuring the first insulating sheet 10P include resins such as polyethylene terephthalate (PET), polyethylene naphthalate (PEN), and polyimide (PI). The first insulating sheet 10P includes a substantially L-shaped main block 10MB and a substantially rectangular tail block 10TB having a width narrower than that of the main block 10MB.

The main block 10MB includes a first belt 11B extending in a predetermined direction and a second belt 12B extending in a direction perpendicular to the direction in which the first belt 11B extends. The first belt 11B and the second belt 12B are connected to each other with first ends thereof shared, and the main block 10MB has a substantially L-shape as described above. The tail block 10TB has a width narrower than that of the second belt 12B, is connected to a second end of the second belt 12B, and extends in a direction identical to the direction in which the second belt 12B extends.

Each of the first electrodes 11F and 12F and the second electrodes 21F and 22F of the first electrode sheet 10 has a substantially circular shape and is disposed on one surface of the main block 10MB. This one surface is a surface facing the second electrode sheet 20. The first electrode 11F is disposed in a region where the first belt 11B and the second belt 12B share. The second electrode 21F has one end located at a position overlapping the first electrode 11F, and is disposed to overlap a second end of a first line segment LS1 extending in the direction in which the belt 11B extends. The second electrode 22F is disposed adjacent to the first electrode 11F and the first electrode 12F is disposed adjacent to the second electrode 22F such that these overlap a second line segment LS2 which has one end at a position overlapping the first electrode 11F, extends in the direction in which the second belt 12B extends and is perpendicular to the first line segment LS1.

The first electrode 11F and the second electrode 21F overlapping the first line segment LS1 are disposed to be displaced from each other in a direction perpendicular to the first line segment LS1. In the present embodiment, the first electrode 11F is displaced with respect to the second electrode 21F toward a first side perpendicular to the first line segment LS1. Accordingly, the second electrode 21F is displaced toward a second side perpendicular to the first line segment LS1 with respect to the first electrode 11F. The second side is a side toward the direction in which the second line segment LS2 extends with respect to the first line segment LS1.

Further, the first electrodes 11F and 12F and the second electrode 22F overlapping the second line segment LS2 are disposed to be displaced from each other in a direction perpendicular to the second line segment LS2. In the present embodiment, the first electrodes 11F and 12F are displaced with respect to the second electrode 22F toward a first side perpendicular to the second line segment LS2. Accordingly, the second electrode 22F is displaced with respect to the first electrodes 11F and 12F toward a second side perpendicular to the second line segment LS2. The second side is a side toward the direction in which the first line segment LS1 extends with respect to the second line segment LS2.

A pair of terminals T1 and T2 is disposed on the tail block 10TB. A surface of the first insulating sheet 10P on which the terminals T1 and T2 are disposed is a surface identical to a surface of the first insulating sheet 10P on which the electrodes are disposed.

A first terminal T1 and the first electrode 12F are electrically connected by the wiring 15A, the first electrode 12F and the first electrode 11F are electrically connected by the wiring 15B, the second electrode 21F and the second electrode 22F are electrically connected by the wiring 15C, and the second electrode 22F and a second terminal T2 are electrically connected by the wiring 15D. Here, when the wiring connected to the pressure-sensitive switch disposed to overlap the first line segment LS1 and disposed on the first belt 11B is a first wiring, and the wiring connected to the pressure-sensitive switch and disposed to overlap the second line segment LS2 and disposed on the second belt 12B is a second wiring, then, a part of the wiring 15C is the first wiring, and the wiring 15B, the other part of the wiring 15C, a part of the wiring 15D, a part of the wiring 15A are the second wiring.

As described above, the first electrodes 11F and 12F are displaced with respect to the second electrode 22F toward the first side perpendicular to the second line segment LS2. Then, as shown in FIG. 2, a straight line that passes an end on the first side perpendicular to the second line segment LS2 of the first electrodes 11F and 12F and is parallel to the second line segment LS2 is referred to as a first straight line L1. Further, as described above, the second electrode 22F is displaced with respect to the first electrodes 11F and 12F toward the second side perpendicular to the second line segment LS2. Then, a straight line that passes an end on the second side perpendicular to the second line segment LS2 of the second electrode 22F and is parallel to the second line segment LS2 is referred to as a second straight line L2. In this case, in the present embodiment, the wirings 15A, 15B, and 15D as the second wiring are disposed between the first straight line L1 and the second straight line L2. Further, the wiring 15B that bypasses the second electrode 22F extends linearly from the first electrode 12F to the first electrode 11F and passes through a first side of the second electrode 22F. Further, the wiring 15D that bypasses the first electrode 12F extends linearly from the second electrode 22F at least until the wiring 15D bypasses a farthest second end of the first electrode 12F. In this way, of the second wiring, the wirings 15B and 15D that bypass the electrode disposed on the second belt 12B extend linearly from the connected electrode beyond the end of the bypassed electrode.

The second electrode sheet 20 as a second electrode sheet includes, as main constituent elements, a second insulating sheet 20P as a second insulating sheet, first electrodes 11S and 12S, second electrodes 21S and 22S, and wirings 25A to 25C.

The second insulating sheet 20P includes an insulating and flexible sheet, similarly to the first insulating sheet 10P. Therefore, examples of a material configuring the second insulating sheet 20P include the material configuring the first insulating sheet 10P.

The second insulating sheet 20P includes a main block 20MB having a shape identical to that of the main block 10MB of the first insulating sheet 10P and a tail block 20TB connected to one end of the main block 20MB and having a shape shorter than that of the tail block 10TB of the first insulating sheet 10P. Thus, the main block 20MB includes a first belt 21B having a shape identical to the first belt 11B of the first insulating sheet and extending in a predetermined direction, and a second belt 22B having a shape identical to the second belt 12B of the first insulating sheet and extending in a direction perpendicular to the direction in which the first belt 21B extends. The first belt 21B and the second belt 22B are connected to each other with first ends thereof shared.

The first electrodes 11S and 12S and the second electrodes 21S and 22S of the second electrode sheet 20 have a shape congruent with the first electrodes 11F and 12F and the second electrodes 21F and 22F of the first electrode sheet 10, and are disposed on one surface of the main block 20MB. This one surface is a surface facing the first electrode sheet 10. Positions where the first electrodes 11S and 12S are disposed are positions corresponding to the first electrodes 11F and 12F of the first electrode sheet 10, and positions where the second electrodes 21S and 22S are disposed are positions corresponding to the second electrodes 21F and 22F of the first electrode sheet 10. Meanwhile, when the first electrode sheet 10 and the second electrode sheet 20 are overlapped and viewed in a plan view, the first line segment LS1 has the first end located at a position overlapping the first electrode 11S as shown in FIG. 2 and extends in the direction in which the first belt 21B extends. The positions where the first electrode 11S and the second electrode 21S are disposed are positions that overlap the first line segment LS1. Further, when the first electrode sheet 10 and the second electrode sheet 20 are overlapped and viewed in a plan view, the second line segment LS2 has the first end located at a position overlapping the first electrode 11S as shown in FIG. 2 and extends perpendicularly to the first line segment LS1 in the direction in which the second belt 22B extends. The positions where the first electrode 11S, the second electrode 22S, and the first electrode 12S are disposed are positions that overlap the second line segment LS2.

The first electrode 12S and the second electrode 22S are electrically connected by the wiring 25A, the second electrode 22S and the first electrode 11S are electrically connected by the wiring 25B, and the first electrode 11S and the second electrode 21S are electrically connected by the wiring 25C.

Further, because the electrodes are disposed at the positions corresponding to the electrodes of the first electrode sheet 10 as described above, the first electrode 11S is displaced with respect to the second electrode 21S toward the first side perpendicular to the first line segment LS1, and the second electrode 21S is displaced with respect to the first electrode 11S toward the second side perpendicular to the first line segment LS1. Further, the first electrodes 11S and 12S are displaced with respect to the second electrode 22S toward the first side perpendicular to the second line segment LS2, and the second electrode 22S is displaced with respect to the first electrodes 11S and 12S toward the second side perpendicular to the second line segment LS2. Further, when the first electrode sheet 10 and the second electrode sheet 20 are overlapped and viewed in a plan view, the first straight line L1 passes the end on the first side perpendicular to the second line segment LS2 of the first electrodes 11S and 12S as shown in FIG. 2, and the second straight line L2 passes the end on the second side perpendicular to the second line segment LS2 of the second electrode 22S. Further, in the present embodiment, the wirings 25A and 25B are disposed between the first straight line L1 and the second straight line L2.

The spacer 30 includes a flexible insulating sheet. Therefore, examples of a material forming the insulating sheet include materials similar to the materials configuring the first insulating sheet 10P and the second insulating sheet 20P. An outer shape of the spacer 30 substantially coincides with that of the second insulating sheet 20P.

The spacer 30 is provided with openings 11H, 12H, 21H, and 22H having an identical size. Each opening has a substantially circular peripheral edge, and has a diameter slightly smaller than a diameter of each electrode of the first electrode sheet 10 and the second electrode sheet 20. Then, when the spacer 30 overlaps the first electrode sheet 10 and the second electrode sheet 20, the opening 11H of the spacer 30 is located inside the peripheral edges of the first electrode 11F and the first electrode 11S, and the opening 12H is located inside the peripheral edge of the first electrode 12F and the first electrode 12S, the opening 21H is located inside the peripheral edge of the second electrode 21F and the second electrode 21S, and the opening 22H is located inside the peripheral edge of the second electrode 22F and the second electrode 22S.

Note that the spacer 30 is provided with a slit as an air vent (not shown), the openings 11H, 12H, 21H, and 22H are spatially connected to each other by the slit, and are further spatially connected to a space outside the spacer 30.

An adhesive material (not shown) for adhering the spacer 30 to the first electrode sheet 10 and the second electrode sheet 20 is applied to both surfaces of the spacer 30.

The sitting sensor 1 in FIG. 1 is configured by integrating the first electrode sheet 10 and the second electrode sheet 20 having the above configuration with the spacer 30 interposed therebetween. Thus, as shown in FIG. 1, the sitting sensor 1 includes a substantially L-shaped main block 1MB and a substantially rectangular tail block 1TB.

The main block 1MB has a first belt 1B having a shape identical to that of the first belts 11B and 21B of the first electrode sheet 10 and the second electrode sheet 20, and a second belt 2B extending in a direction perpendicular to a direction in which the first belt 1B extends and having an identical shape as that of the second belts 12B and 22B of the first electrode sheet 10 and the second electrode sheet 20. The first belt 1B and the second belt 2B are therefore connected to each other with first ends thereof shared. Thus, the sitting sensor 1 according to the present embodiment has a substantially L-shape as a whole.

Further, in the tail block 1TB, a part of the tail block 10TB of the first electrode sheet 10 is exposed, and the pair of terminals T1 and T2 is exposed from this exposed part. The tail block 1TB has a width narrower than that of the second belt 2B, is connected to a second end of the second belt 2B, and extends in a direction identical to the direction in which the second belt 2B extends.

Figure 3:
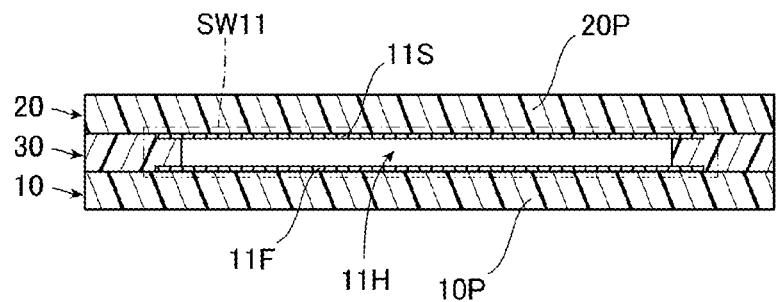
FIG. 3 is a sectional view taken along line in FIG. 1.

FIG. 3 is a sectional view taken along line III-III in FIG. 1. As shown in FIG. 3, the first electrode sheet 10 and the second electrode sheet 20 are integrated with the spacer 30 interposed therebetween, and thus the first electrode 11F and the first electrode 11S face each other with a predetermined space apart at the opening 11H to form a first pressure-sensitive switch SW11. Further, although not shown, similarly, the first electrode 12F and the first electrode 12S face each other with a predetermined space apart at the opening 12H to form a first pressure-sensitive switch SW12, the second electrode 21F and the second electrode 21S face each other with a predetermined space apart at the opening 21H to form a second pressure-sensitive switch SW21, and the second electrode 22F and the second electrode 22S face each other with a predetermined space apart at the opening 22H to form a second pressure-sensitive switch SW22.

When a load is applied to each pressure-sensitive switch, the first electrode and the second electrode of each pressure-sensitive switch come in contact with each other. Thus, the pressure-sensitive switches in which the first electrode and the second electrode are in contact are turned on. At this time, a part of air in the openings of the spacer 30 moves through the slit and is discharged to the outside.

As shown in FIG. 1, the main block 1MB includes a plurality of such pressure-sensitive switches. Here, when the first pressure-sensitive switch SW11 is a first specific pressure-sensitive switch, the sitting sensor 1 includes at least one first pressure-sensitive switch SW11, SW12 including one first specific pressure-sensitive switch and at least two second pressure-sensitive switches SW21 and SW22. When the pressure-sensitive switches included in the first belt 1B are in a first pressure-sensitive switch group and the pressure-sensitive switches included in the second belt 2B are in a second pressure-sensitive switch group, the first specific pressure-sensitive switch is disposed in a region where the first belt 1B and the second belt 2B share, and belongs commonly to the first pressure-sensitive switch group and the second pressure-sensitive switch group. Thus, the first pressure-sensitive switch group includes at least one first pressure-sensitive switch SW11 including the first specific pressure-sensitive switch and at least one second pressure-sensitive switch SW21. Further, the second pressure-sensitive switch group includes at least one first pressure-sensitive switch SW11, SW12 including the first specific pressure-sensitive switch and at least one second pressure-sensitive switch SW22.

Figure 4:
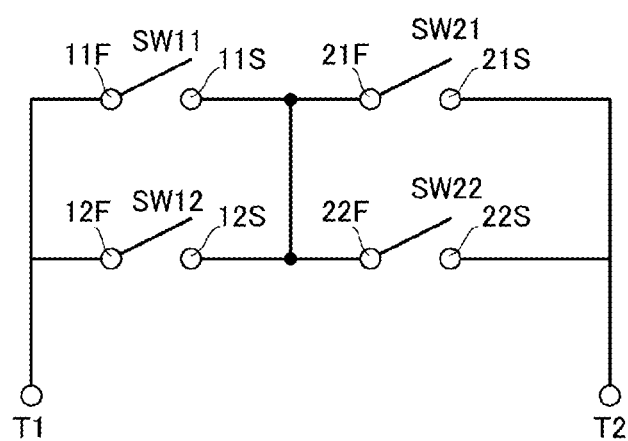
FIG. 4 is a circuit diagram of the sitting sensor in FIG. 1.

FIG. 4 is a circuit diagram of the sitting sensor 1 in FIG. 1. As shown in FIG. 4, the first pressure-sensitive switch SW11 and the first pressure-sensitive switch SW12 are electrically connected in parallel to each other, and the second pressure-sensitive switch SW21 and the second pressure-sensitive switch SW22 are electrically connected in parallel to each other. Further, the first pressure-sensitive switch SW11 and the first pressure-sensitive switch SW12 are connected in series, and the second pressure-sensitive switch SW21 and the second pressure-sensitive switch SW22 are connected in series. Thus, in the sitting sensor 1, turning on at least one first pressure-sensitive switch and at least one second pressure-sensitive switch causes a current to flow between the pair of terminals T1 and T2.

Figure 5:
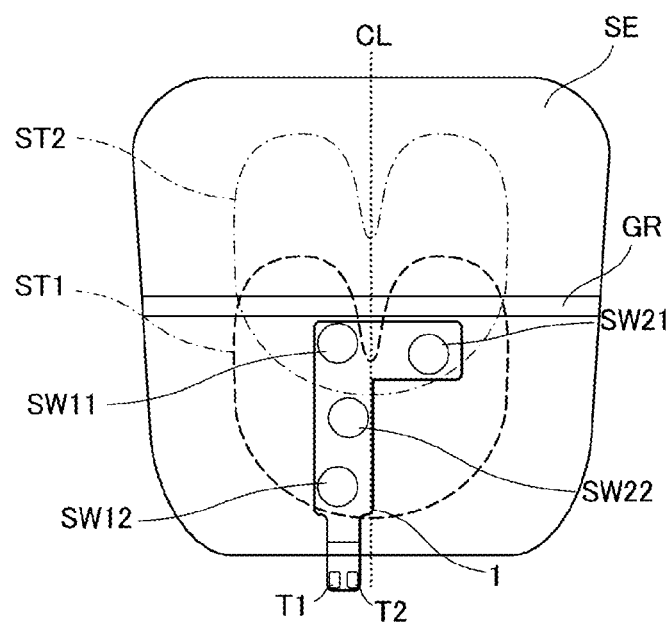
FIG. 5 is a diagram showing an example of a state in which the sitting sensor in FIG. 1 is disposed in a seat.

FIG. 5 is a diagram showing an example of a state in which the sitting sensor 1 is disposed in a seat. In the present embodiment, the sitting sensor 1 is disposed between a seat cushion of a seat SE and a cover that surrounds the seat cushion. The seat cushion of the seat SE according to the present embodiment is provided with a groove GR extending in a left-right direction of a seat surface. Thus, in the present embodiment, the sitting sensor 1 is disposed not to straddle the groove GR. Specifically, the sitting sensor 1 is disposed such that a longitudinal direction of the second belt 2B extends in a front-rear direction of the seat SE, and a longitudinal direction of the first belt 1B extends along the left-right direction of the seat SE, at a rear part of the seat SE with respect to the groove GR. The front-rear direction of the seat SE is a direction within 30 degrees from a central line CL in a width direction of the seat SE, and the left-right direction of the seat is a direction within 30 degrees from a line perpendicular to the central line CL in the width direction of the seat. FIG. 5 shows that the sitting sensor 1 is disposed on the seat SE such that the longitudinal direction of the second belt 2B extends in a direction of the central line CL of the seat SE, and the longitudinal direction of the first belt 1B extends in a direction perpendicular to the central line CL of the seat SE.

Here, as shown in FIG. 1, when the sitting sensor 1 is viewed in a plan view, the first line segment LS1 has the first end located at a position overlapping the first pressure-sensitive switch SW11 as the first specific pressure-sensitive switch and extends in the direction in which the first belt 1B extends. The second pressure-sensitive switch SW21 is disposed to overlap the second end of the first line segment LS1. Thus, in the first belt 1B, the first pressure-sensitive switch and the second pressure-sensitive switch are disposed adjacent to each other to overlap the first line segment LS1. As described above, the longitudinal direction of the first belt 1B is along the left-right direction of the seat SE. Thus, in the first pressure-sensitive switch group, the first specific pressure-sensitive switch is located at an end, and the first pressure-sensitive switch SW11 and the second pressure-sensitive switch SW21 are disposed adjacent to each other along the left-right direction of the seat SE. Further, the second line segment LS2 has the first end located at the position overlapping the first pressure-sensitive switch SW11 as the first specific pressure-sensitive switch and extends in the direction that is perpendicular to the first line segment LS1 and in which the second belt 2B extends. The second pressure-sensitive switch SW22 is disposed adjacent to the first pressure-sensitive switch SW11 and the first pressure-sensitive switch SW12 is disposed adjacent to the second pressure-sensitive switch SW22 to overlap the second line segment LS2. As a result, in the second belt 2B, the first pressure-sensitive switches and the second pressure-sensitive switches are alternately disposed adjacent to each other to overlap the second line segment LS2. As described above, the second belt 2B extends along the front-rear direction of the seat SE. Thus, in the second pressure-sensitive switch group, the first specific pressure-sensitive switch is located at an end, and the first pressure-sensitive switches SW11 and SW12 and the second pressure-sensitive switch SW21 are disposed adjacent to each other along the front-rear direction of the seat SE.

Further, as described above, the first electrodes 11F and 11S and the second electrodes 21F and 21S are displaced from each other in the direction perpendicular to the first line segment LS1, and thus the first pressure-sensitive switch SW11 overlapping the first line segment LS1 and the second pressure-sensitive switch SW21 are displaced from each other in the direction perpendicular to the first line segment LS1. That is, of the pressure-sensitive switches of the first pressure-sensitive switch group, the first pressure-sensitive switch SW11 and the second pressure-sensitive switch SW21 are disposed to be displaced from each other in the front-rear direction of the seat SE. The first pressure-sensitive switch SW11 is displaced with respect to the second pressure-sensitive switch SW21 toward a first side in the front-rear direction of the seat SE, and the second pressure-sensitive switch SW21 is displaced with respect to the first pressure-sensitive switch SW11 toward a second side in the front-rear direction of the seat SE. As shown in FIG. 5, the first side in the front-rear direction of the seat SE according to the present embodiment is a front side, and the second side in the front-rear direction of the seat SE is a rear side. The second pressure-sensitive switch SW21 is displaced with respect to the first pressure-sensitive switch SW11 in the direction in which the second line segment LS2 extends with respect to the first line segment LS1.

Further, as described above, the first electrodes 11F, 11S, 12F, and 12S and the second electrodes 22F and 22S are displaced from each other in the direction perpendicular to the second line segment LS2, and thus the first pressure-sensitive switches SW11 and SW12 and the second pressure-sensitive switch SW22 overlapping the second line segment LS2 are displaced from each other in the direction perpendicular to the second line segment LS2. That is, of the pressure-sensitive switches of the second pressure-sensitive switch group, the first pressure-sensitive switches SW11 and SW12 and the second pressure-sensitive switch SW22 are disposed to be displaced from each other in the left-right direction of the seat SE. The first pressure-sensitive switches SW11 and SW12 are displaced with respect to the second pressure-sensitive switch SW22 toward the first side in the left-right direction of the seat SE, and the second pressure-sensitive switch SW22 is displaced with respect to the first pressure-sensitive switches SW11 and SW12 toward the second side in the left-right direction of the seat SE. As shown in FIG. 5, the first side in the left-right direction of the seat SE according to the present embodiment is a left side, and the second side in the left-right direction of the seat SE is a right side. The second pressure-sensitive switch SW22 is displaced with respect to the first pressure-sensitive switches SW11 and SW12 in the direction in which the first line segment LS1 extends with respect to the second line segment LS2.

Further, when the sitting sensor 1 is viewed in a plan view, the first straight line L1 extends in the front-rear direction of the seat SE through the end on a farthest first side in the left-right direction of the first pressure-sensitive switches SW11 and SW12, and the second straight line L2 extends in parallel to the first straight line L1 through the end on a farthest second side in the left-right direction of the second pressure-sensitive switch SW22. Thus, in the present embodiment, the first straight line L1, the second line segment LS2, and the second straight line L2 are parallel to one other.

Figure 6:
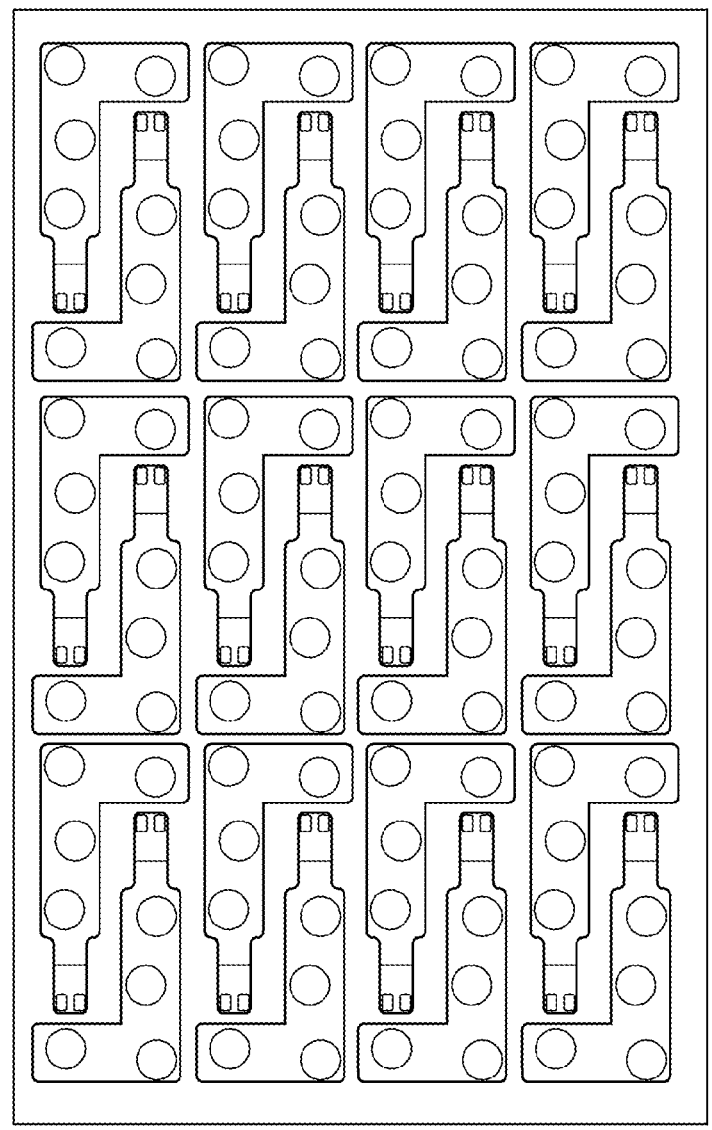
FIG. 6 is a diagram showing a state in which the sitting sensor in FIG. 1 is imposed during mass production.

FIG. 6 is a diagram showing a state in which the sitting sensor 1 is imposed during mass production. As described above, the sitting sensor 1 has a substantially L-shape. Thus, by alternately arranging a plurality of the sitting sensors 1 as shown in FIG. 6, the plurality of sitting sensors 1 can be efficiently imposed.

As described above, in the sitting sensor 1 according to the present embodiment, the plurality of pressure-sensitive switches are configured by at least one first pressure-sensitive switch SW11, SW12 including one first specific pressure-sensitive switch and at least two second pressure-sensitive switches SW21 and SW22, and include the first pressure-sensitive switch group including at least one first pressure-sensitive switch SW11 including one first specific pressure-sensitive switch and at least one second pressure-sensitive switch SW21 and the second pressure-sensitive switch group including at least one first pressure-sensitive switch SW11, SW12 including the first specific pressure-sensitive switch and at least one second pressure-sensitive switch SW22 that is different from the second pressure-sensitive switch SW21 in the first pressure-sensitive switch group. In the first pressure-sensitive switch group, the first specific pressure-sensitive switch is located at the end, and the first pressure-sensitive switch SW11 and the second pressure-sensitive switch SW21 are adjacent to each other along the left-right direction of the seat SE. In the second pressure-sensitive switch group, the first specific pressure-sensitive switch is located at the end, and the first pressure-sensitive switches SW11 and SW12 and the second pressure-sensitive switch SW22 are adjacent to each other along the front-rear direction of the seat SE. Turning on at least one first pressure-sensitive switch and at least one second pressure-sensitive switch causes a current to flow between the pair of terminals T1 and T2.

In this sitting sensor 1, the first pressure-sensitive switches SW11 and SW12 and the second pressure-sensitive switch SW22 of the second pressure-sensitive switch group are disposed along the front-rear direction of the seat SE as shown in FIG. 5, and thus sitting can be appropriately detected when the applied load is dispersed in the front-rear direction of the seat SE. Here, in FIG. 5, a region ST1 to which the load is applied on the seat SE when the occupant sits at a normal position is indicated by a broken line, and a region ST2 to which the load is applied on the seat SE when the occupant sits at a forward position is indicated by a chain line. As shown in FIG. 5, the first pressure-sensitive switch SW11 and the second pressure-sensitive switch SW21 of the first pressure-sensitive switch group are disposed along the left-right direction of the seat SE at a front part of the sitting sensor 1 according to the present embodiment. Thus, when the occupant sits at the forward position as shown in FIG. 5, the first pressure-sensitive switch SW11 and the second pressure-sensitive switch SW21 of the first pressure-sensitive switch group can be simultaneously turned on. Therefore, the sitting sensor 1 according to the present embodiment can detect the sitting more appropriately than the sitting detection device in which all the pressure-sensitive switches are linearly disposed.

Further, the first insulating sheet 10P and the second insulating sheet 20P according to the present embodiment have the first belts 11B and 21B overlapping the first pressure-sensitive switch SW11 and the second pressure-sensitive switch SW21 of the first pressure-sensitive switch group and along extending along the left-right direction of the seat SE, and the second belts 12B and 22B overlapping the first pressure-sensitive switches SW11 and SW12 and the second pressure-sensitive switch SW22 of the second pressure-sensitive switch group and extending along the front-rear direction of the seat SE.

Thus, even when a stress is applied in such a direction that the first pressure-sensitive switch SW11 and the second pressure-sensitive switch SW21 of the first pressure-sensitive switch group are separated from each other due to sitting by the occupant, the first belts 11B and 21B, which extend along the left-right direction of the seat SE, prevent the first pressure-sensitive switch SW11 and the second pressure-sensitive switch SW21 of the first pressure-sensitive switch group from being separated from each other. Further, even when a stress is applied in such a direction that the first pressure-sensitive switches SW11 and SW12 and the second pressure-sensitive switch SW22 of the second pressure-sensitive switch group are separated from each other due to sitting, the second belts 12B and 22B, which extend along the front-rear direction of the seat SE, prevent the first pressure-sensitive switches SW11 and SW12 and the second pressure-sensitive switch SW22 of the second pressure-sensitive switch group from being separated from each other. This suppresses a relative displacement of the pressure-sensitive switches.

Further, in the sitting sensor 1, the first pressure-sensitive switches SW11 and SW12 and the second pressure-sensitive switch SW22 of the second pressure-sensitive switch group are disposed to be displaced from each other in the left-right direction of the seat SE. The wirings 15B and 15D as the second wiring is disposed between the first straight line L1 extending in the front-rear direction of the seat SE through the end on the first side of the first pressure-sensitive switches SW11 and SW12 disposed to be displaced farthest to the first side in the left-right direction of the seat SE, and the second straight line L2 that passes the end on the second side of the second pressure-sensitive switch SW22 disposed to be displaced farthest to the second side in the left-right direction of the seat SE and is parallel to the first straight line L1.

If the first pressure-sensitive switches SW11 and SW12 and the second pressure-sensitive switch SW22 of the second pressure-sensitive switch group are disposed in a row along the front-rear direction of the seat SE without a displacement in the left-right direction, for example, if the wiring 15B connected to the first pressure-sensitive switch SW11 bypasses the second pressure-sensitive switch SW22 and extends, the wiring 15B would have to rise in the left-right direction of the seat SE and extend along the second pressure-sensitive switch SW22. However, in the sitting sensor 1 according to the present embodiment, although the wiring 15B as the second wiring connected to the first pressure-sensitive switches SW11 and SW12, which are displaced toward the first side in the left-right direction of the seat SE, bypasses the second pressure-sensitive switch SW22 displaced toward the second side in the left and right of the seat SE, the wiring 15B as the second wiring can be linearly disposed until the wiring 15B bypasses a part located on the farthest first side of the second pressure-sensitive switch SW22. Similarly, the wiring 15D as the second wiring connected to the second pressure-sensitive switch SW22 that is displaced toward the second side in the left-right direction of the seat SE bypasses the first pressure-sensitive switch SW12 that is displaced toward the first side in the left-right direction of the seat SE, the wiring 15D as the second wiring can be linearly disposed until the wiring 15D bypasses a part located on the farthest second side of the first pressure-sensitive switch SW12. This can simplify a wiring design.

Further, in the present embodiment, the number of pressure-sensitive switches in the second pressure-sensitive switch group is larger than the number of pressure-sensitive switches in the first pressure-sensitive switch group. The occupant sitting in the seat SE generally tends to sit so as to be displaced in the front-rear direction of the seat SE rather than in the left-right direction of the seat SE. Therefore, because the number of pressure-sensitive switches of the second pressure-sensitive switch group is larger than the number of pressure-sensitive switches of the first pressure-sensitive switch group similarly in the sitting sensor 1 according to the present embodiment, even if the occupant sits so as to be displaced in the front-rear direction of the seat SE, the sitting can be detected more appropriately.

Second Embodiment

Next, a second embodiment will be described. In the description of the present embodiment, constituent elements that are the same as or equivalent to those in the first embodiment will be assigned the same reference numerals and redundant description will not be repeated unless otherwise specified.

Figure 7:
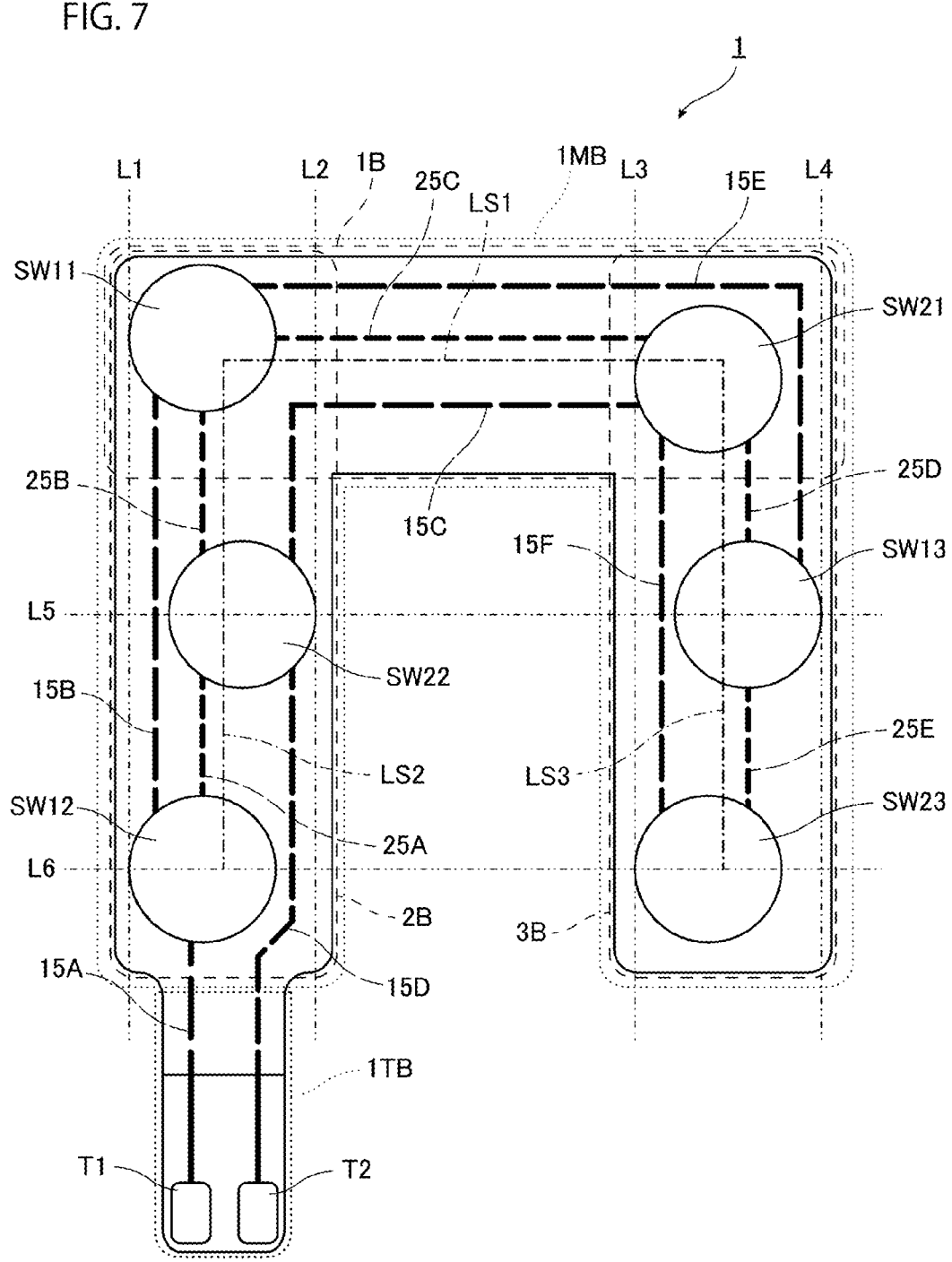
FIG. 7 is a plan view of a sitting sensor according to a second embodiment.
Figure 8:
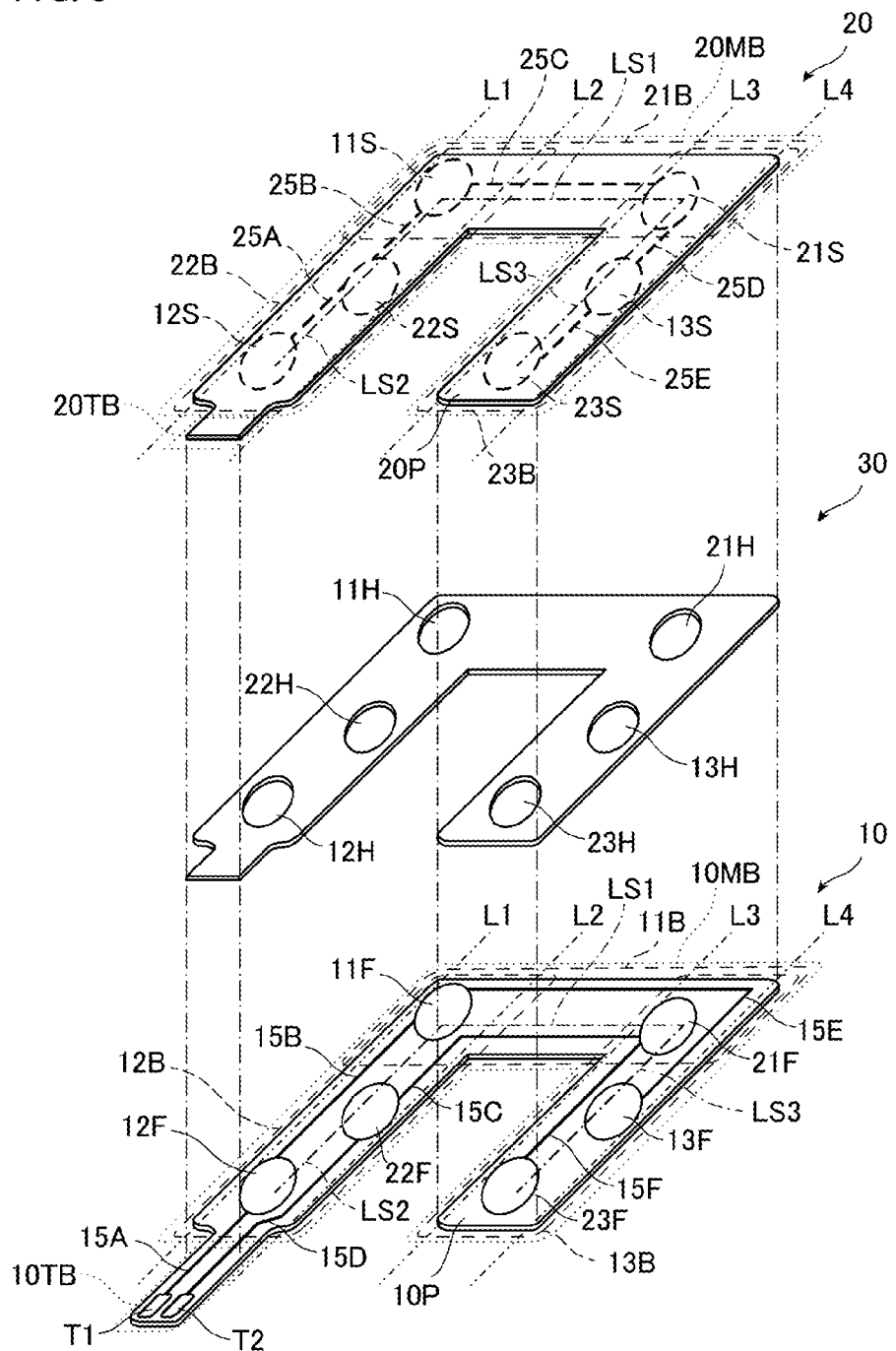
FIG. 8 is an exploded view of the sitting sensor in FIG. 7.

FIG. 7 is a plan view of the sitting sensor according to the present embodiment. FIG. 8 is an exploded view of the sitting sensor in FIG. 7. As shown in FIGS. 7 and 8, the sitting sensor 1 according to the present embodiment is different from the sitting sensor 1 according to the first embodiment in that the sitting sensor 1 according to the present embodiment further includes a third belt 3B having a first pressure-sensitive switch SW13 and a second pressure-sensitive switch SW23, and the distance between the first pressure-sensitive switch SW11 and the second pressure-sensitive switch SW21 is longer.

The first electrode sheet 10 according to the present embodiment is mainly different from the first electrode sheet 10 according to the first embodiment in that the main block 10MB of the first insulating sheet 10p includes the third belt 13B, and that a first electrode 13F and a second electrode 23F are disposed on the third belt 13B. The first belt 11B and the third belt 13B are connected to each other with the second end of the first belt 11B and a first end of the third belt 13B shared. Thus, the main block 10MB has a substantially U-shape. In the present embodiment, a distance between the second belt 12B and the third belt 13B is larger than the width of the second belt 12B and a width of the third belt 13B.

The first electrode 13F and the second electrode 23F of the first electrode sheet 10 have a configuration similar to that of the first electrodes 11F and 12F and the second electrodes 21F and 22F, and are disposed on one surface of the third belt 13B. In the present embodiment, the second electrode 21F is disposed in a region where the first belt 11B and the third belt 13B share. Further, the electrode 13F is disposed adjacent to the second electrode 21F and the second electrode 23F is disposed adjacent to the first electrode 13F to overlap a third line segment LS3 that has a first end located at a position overlapping the second electrode 21F, is perpendicular to the first line segment LS1, and extends in a direction in which the third belt 13B extends. The third line segment LS3 extends on a side of the second line segment LS2 with respect to the first line segment LS1.

The first electrode 13F and the second electrodes 21F and 23F overlapping the third line segment LS3 are disposed to be displaced from each other in a direction perpendicular to the third line segment LS3. In the present embodiment, the second electrodes 22F and 23F are displaced with respect to the first electrode 13F toward a first side perpendicular to the third line segment LS3. The first electrode 13F is therefore displaced with respect to the second electrodes 22F and 23F toward a second side perpendicular to the third line segment LS3. The first side is a side toward the direction in which the first line segment LS1 extends with respect to the third line segment LS3.

The first electrode 13F is electrically connected to the first electrode 11F by a wiring 15E, and the second electrode 23F is electrically connected to the second electrode 21F by a wiring 15F. Here, when the wiring connected to the pressure-sensitive switch disposed to overlap the third line segment LS3 and disposed on the third belt 13B is a third wiring, a part of the wiring 15E and the wiring 15F are the third wiring. According to a definition of the first wiring described in the first embodiment, the other part of the wiring 15E is the first wiring.

As described above, the second electrodes 21F and 23F are displaced with respect to the first electrode 13F toward the first side perpendicular to the third line segment LS3. Then, as shown in FIG. 8, a straight line that passes an end on the first side perpendicular to the third line segment LS3 of the second electrodes 21F and 23F and is parallel to the third line segment LS3 is referred to as a third straight line L3. Further, as described above, the first electrode 13F is displaced with respect to the second electrodes 21F and 23F toward the second side perpendicular to the third line segment LS3. Then, a straight line that passes an end of on the second side perpendicular to the third line segment LS3 of the first electrode 13F and is parallel to the third line segment LS3 is referred to as a fourth straight line L4. In this case, in the present embodiment, a part of the wiring 15E and the wiring 15F are disposed between the third straight line L3 and the fourth straight line L4. Further, the wiring 15F that bypasses the first electrode 13F extends linearly from the second electrode 21F to the second electrode 23F and passes through the first side of the first electrode 13F. Further, the wiring 15E that bypasses the second electrode 21F extends from the first electrode 13F to the first electrode 11F, and passes through the second side of the second electrode 21F on the third belt 3B. In this way, of the second wiring, the wiring 15F that bypasses the first electrode 13F disposed on the third belt 13B extends linearly from the connected electrode beyond the part of the bypassed first electrode 13F.

Further, as described in the first embodiment, the first electrode 11F is displaced with respect to the second electrode 21F toward the first side perpendicular to the first line segment LS1, and the second electrode 21F is displaced with respect to the first electrode 11F toward the second side perpendicular to the first line segment LS1. Therefore, the wiring 15E that bypasses the second electrode 21F passes through the first side of the second electrode 21F on the first belt 11B. In this way, of the first wiring, the other part of the wiring 15E that bypasses the second electrode 21F disposed on the first belt 11B extends linearly from the connected electrode beyond the part of the bypassed second electrode 21F.

The second electrode sheet 20 according to the present embodiment is mainly different from the second electrode sheet 20 according to the first embodiment in that the main block 20MB of the second insulating sheet 20P includes the third belt 23B, and that a first electrode 13S and a second electrode 23S are disposed on the third belt 23B. The first belt 21B and the third belt 23B are connected to each other with the second end of the first belt 11B and a first end of the third belt 13B shared.

The first electrode 13S and the second electrode 23S of the second electrode sheet 20 have a configuration similar to that of the first electrode 13F and the second electrode 23F of the first electrode sheet 10, and are disposed on one surface of the third belt 23B. The first electrode 13S and the second electrode 23S are located at positions corresponding to the first electrode 13F and the second electrode 23F in the first electrode sheet 10, respectively. Meanwhile, when the first electrode sheet 10 and the second electrode sheet 20 according to the present embodiment are overlapped and viewed in a plan view, the third line segment LS3 has the first end located at a position overlapping the second electrode 21F as shown in FIG. 8 and extends in the direction that is perpendicular to the first line segment LS1 and in which the third belt 23B extends. The positions where the second electrode 21S, the first electrode 13S, and the second electrode 23S are disposed are positions where these electrodes overlap the second line segment LS2.

The second electrode 21S and the first electrode 13S are electrically connected by a wiring 25D, and the first electrode 13S and the second electrode 23S are electrically connected by a wiring 25E.

Further, as described above, because the first electrode 13S and the second electrode 23S are disposed at the positions corresponding to the first electrode 13F and the second electrode 23F in the first electrode sheet 10, respectively, the second electrodes 21S and 23S are displaced with respect to the first electrode 13S toward the first side perpendicular to the third line segment LS3, and the first electrode 13S is displaced with respect to the second electrodes 21S and 23S toward the second side perpendicular to the third line segment LS3. Further, when the first electrode sheet 10 and the second electrode sheet are overlapped and viewed in a plan view, the third straight line L3 passes the end on the first side perpendicular to the third line segment LS3 of the second electrode 21S and the second electrode 23S as shown in FIG. 8, and the fourth straight line L4 passes the end on the second side perpendicular to the third line segment LS3 of the first electrode 13S. Then, in the present embodiment, the wirings 25D and 25E are disposed between the third straight line L3 and the fourth straight line L4.

The spacer 30 according to the present embodiment has the outer shape that substantially coincides with that of the second insulating sheet 20P, and mainly differs from the spacer 30 according to the first embodiment in that openings 13H and 23H are formed. The openings 13H and 23H have a similar shape as the other openings 11H and the like, and have a diameter slightly smaller than a diameter of each electrode of the first electrode sheet 10 and the second electrode sheet 20. Then, when the spacer 30 overlaps the first electrode sheet 10 and the second electrode sheet 20, the opening 13H of the spacer 30 is located inside the peripheral edges of the first electrode 13F and the first electrode 13S, and the opening 23H is located inside the peripheral edges of the second electrode 23F and the second electrode 23S.

Note that, similarly to the spacer 30 of the first embodiment, the spacer 30 is provided with a slit as an air vent (not shown), and the openings spatially communicate with each other and also spatially communicate with a space outside the spacer 30.

The sitting sensor 1 in FIG. 7 is configured by integrating the first electrode sheet 10 and the second electrode sheet 20 having the above configuration with the spacer 30 interposed therebetween. Thus, as shown in FIG. 7, the sitting sensor 1 includes a substantially U-shaped main block 1MB and a substantially rectangular tail block 1TB.

The main block 1MB according to the present embodiment is mainly different from the main block 1MB according to the first embodiment in that the main block 1MB includes a third belt 3B having a shape identical to that of the third belts 13B and 23B of the first electrode sheet 10 and the second electrode sheet 20. The second end of the first belt 1B and the first end of the third belt 3B therefore share each other. Thus, the sitting sensor 1 according to the present embodiment has a substantially U-shape as a whole. In the present embodiment, as described above, the distance between the second belt 12B and the third belt 13B is larger than the width of the second belt 12B and the width of the third belt 13B. Thus, a distance between the second belt 2B and the third belt 3B of the sitting sensor 1 is larger than a width of the second belt 2B and a width of the third belt 3B.

In the present embodiment, the first electrode 13F of the first electrode sheet 10 and the first electrode 13S of the second electrode sheet 20 face each other with a predetermined space apart at the opening 13H of the spacer 30 to form the first pressure-sensitive switch SW13. The second electrode 23F of the first electrode sheet 10 and the second electrode 23S of the second electrode sheet 20 face each other with a predetermined space apart at the opening 23H of the spacer 30 to form a second pressure-sensitive switch SW23.

Thus, as shown in FIG. 7, the main block 1MB includes a plurality of the pressure-sensitive switches. Here, when the second pressure-sensitive switch SW21 is the second specific pressure-sensitive switch and the pressure-sensitive switches included in the third belt 3B are in the third pressure-sensitive switch group, the second specific pressure-sensitive switch is disposed in a region where the first belt 1B and the third belt 3B share, and belongs commonly to the first pressure-sensitive switch group and the third pressure-sensitive switch group. Thus, the third pressure-sensitive switch group includes at least one first pressure-sensitive switch SW13 including the second specific pressure-sensitive switch and at least one second pressure-sensitive switch SW21, SW23.

Figure 9:
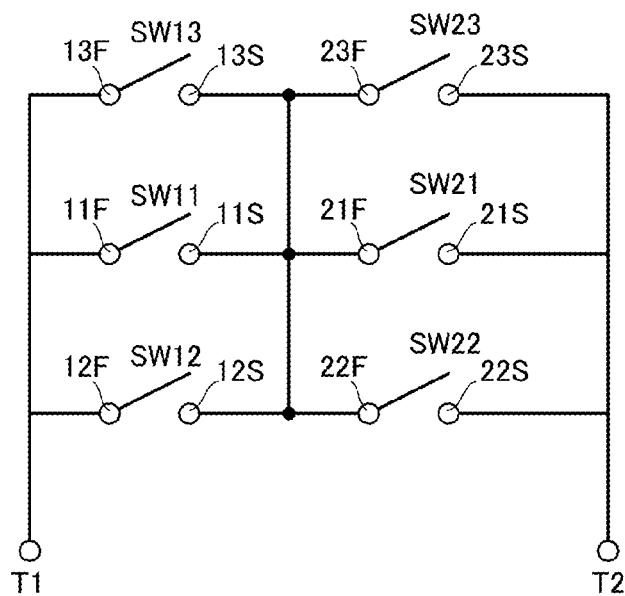
FIG. 9 is a circuit diagram of the sitting sensor in FIG. 7.

FIG. 9 is a circuit diagram of the sitting sensor 1 in FIG. 7. As shown in FIG. 9, the first pressure-sensitive switches SW11, SW12, and SW13 are electrically connected in parallel to each other, and the second pressure-sensitive switches SW21, SW22, and SW23 are electrically connected in parallel to each other. Further, the first pressure-sensitive switches SW11, SW12, and SW13 and the second pressure-sensitive switches SW21, SW22, and SW23 are connected in series to each other. Therefore, also in the sitting sensor 1 according to the present embodiment, turning on at least one first pressure-sensitive switch and at least one second pressure-sensitive switch causes a current to flow between the pair of terminals T1 and T2.

Figure 10:
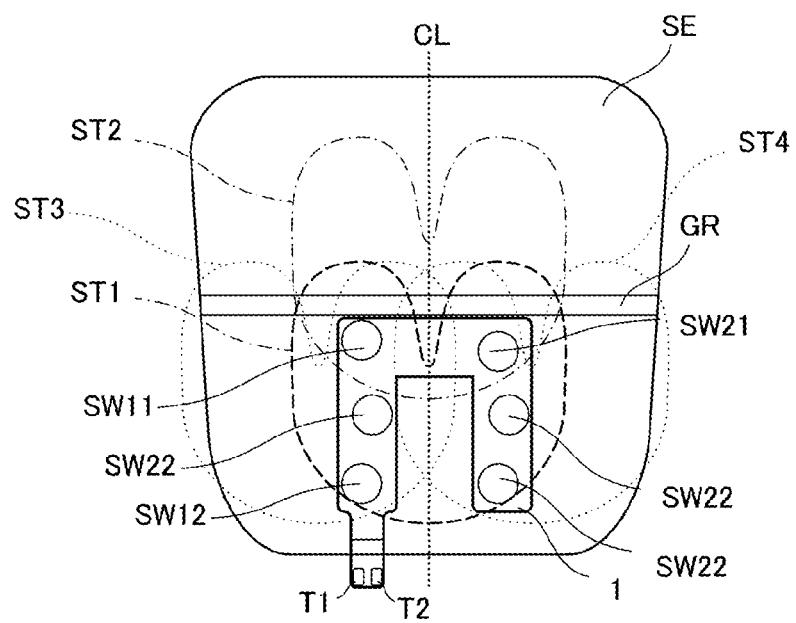
FIG. 10 is a diagram showing an example of a state in which the sitting sensor in FIG. 7 is disposed in a seat.

FIG. 10 is a diagram showing an example of a state in which the sitting sensor 1 is disposed in a seat. In the present embodiment, the sitting sensor 1 is disposed between the seat cushion of the seat SE and the cover surrounding the seat cushion, similarly to the sitting sensor 1 according to the first embodiment. Further, in the present embodiment, the sitting sensor 1 is disposed not to straddle the groove GR. Specifically, the sitting sensor 1 is disposed such that the second belt 2B and the third belt 3B extend in a front-rear direction of the seat SE, and the longitudinal direction of the first belt 1B extends along the left-right direction of the seat SE, at a rear part of the seat SE with respect to the groove GR. FIG. 10 shows that the sitting sensor 1 is disposed on the seat SE such that the longitudinal direction of the second belt 2B and the third belt 3B extends in a direction of the central line CL of the seat SE, and that the longitudinal direction of the first belt 1B extends in a direction perpendicular to the central line CL of the seat SE.

Here, as shown in FIG. 7, when the sitting sensor 1 is viewed in a plan view, the third line segment LS3 has the first end located at a position overlapping the second pressure-sensitive switch SW21 as the second specific pressure-sensitive switch and extends in the direction that is perpendicular to the first line segment LS1 and in which the third belt 3B extends. The first pressure-sensitive switch SW13 is disposed adjacent to the second pressure-sensitive switch SW21 and the second pressure-sensitive switch SW23 is disposed adjacent to the first pressure-sensitive switch SW13 to overlap the third line segment LS3. As a result, in the third belt 3B, the first pressure-sensitive switches and the second pressure-sensitive switches are alternately disposed adjacent to each other to overlap the third line segment LS3. As described above, the third belt 3B extends along the front-rear direction of the seat SE. Thus, in the third pressure-sensitive switch group, the second specific pressure-sensitive switch is located at an end, and the first pressure-sensitive switch SW13 and the second pressure-sensitive switches SW21 and SW23 are disposed adjacent to each other along the front-rear direction of the seat SE.

Furthermore, in the present embodiment, a set of the first pressure-sensitive switch SW13 on the third belt 3B and the second pressure-sensitive switch SW22 on the second belt 2B is located so as to overlap a straight line L5 along the left-right direction of the seat SE. A set of the first pressure-sensitive switch SW12 on the second belt 2B and the second pressure-sensitive switch SW23 on the third belt 3B is located so as to overlap another straight line L6 along the left-right direction of the seat SE. The first pressure-sensitive switch SW11 and the second pressure-sensitive switch SW21 on the first belt 1B overlap the first line segment LS1 along the left-right direction of the seat SE as described above. Therefore, the sitting sensor 1 according to the present embodiment has a plurality of sets of the first pressure-sensitive switches and the second pressure-sensitive switches which overlap the straight line along the left-right direction of the seat SE.

Further, as described above, the second electrodes 21F, 21S, 23F, and 23S and the first electrodes 13F and 13S are displaced from each other in the direction perpendicular to the third line segment LS3, and thus the second pressure-sensitive switches SW21 and SW23 and the first pressure-sensitive switch SW13 overlapping the third line segment LS3 are displaced from each other in the direction perpendicular to the third line segment LS3. That is, in the pressure-sensitive switches of the third pressure-sensitive switch group, the first pressure-sensitive switch SW13 and the second pressure-sensitive switches SW21 and SW23 are disposed to be displaced from each other in the left-right direction of the seat SE. The second pressure-sensitive switches SW21 and SW23 are displaced with respect to the first pressure-sensitive switch SW13 toward the first side in the left-right direction of the seat SE, and the first pressure-sensitive switch SW13 is displaced with respect to the second pressure-sensitive switches SW21 and SW23 toward the second side in the left-right direction of the seat SE. As shown in FIG. 10, similarly to the first embodiment, the first side in the left-right direction of the seat SE according to the present embodiment is the left side, and the second side in the left-right direction of the seat SE is the right side. Note that the second pressure-sensitive switches SW21 and SW23 are displaced with respect to the first pressure-sensitive switch SW13 in the direction in which the first line segment LS1 extends with respect to the third line segment LS3.

Further, when the sitting sensor 1 is viewed in a plan view, the third straight line L3 extends in the front-rear direction of the seat SE through the end on a farthest first side in the left-right direction of the second pressure-sensitive switches SW21 and SW23, and the fourth straight line L4 extends in parallel to the third straight line L3 through the end on a farthest second side in the left-right direction of the first pressure-sensitive switch SW13. Thus, in the present embodiment, the third straight line L3, the third line segment LS3, and the fourth straight line L4 are parallel to one other.

Figure 11:
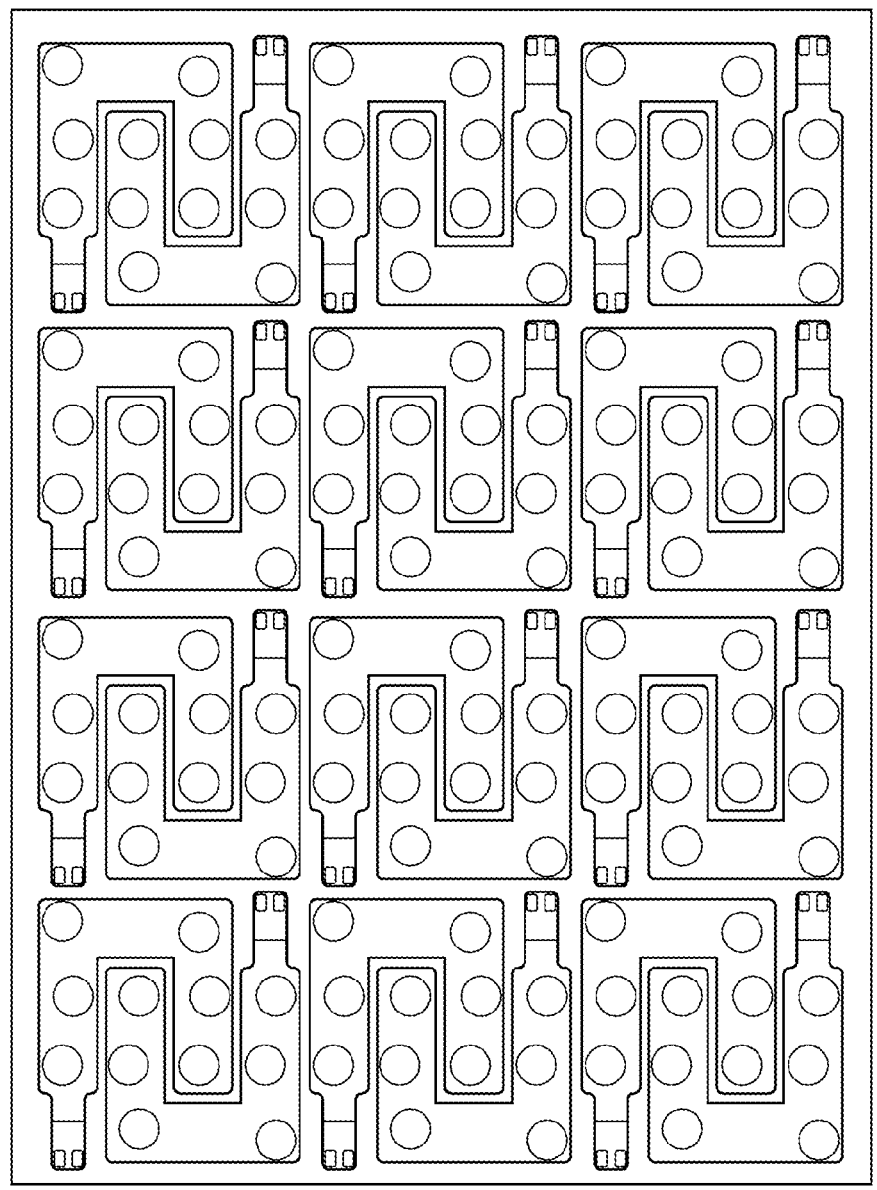
FIG. 11 is a diagram showing a state in which the sitting sensor in FIG. 7 is imposed during mass production.

FIG. 11 is a diagram showing a state in which the sitting sensor 1 is imposed during mass production. As described above, the sitting sensor 1 according to the present embodiment has a substantially U-shape, and the distance between the second belt 2B and the third belt 3B is larger than the width of the second belt 2B and the width of the third belt 3B. Thus, by alternately arranging and nesting a plurality of the sitting sensors 1 as shown in FIG. 11, the plurality of sitting sensors 1 can be efficiently imposed.

As described above, as compared with the sitting sensor 1 according to the first embodiment, the sitting sensor 1 according to the present embodiment further includes the third pressure-sensitive switch group, in which the second pressure-sensitive switch SW21 located at the end opposite to the first specific pressure-sensitive switch of the first pressure-sensitive switch group is the second specific pressure-sensitive switch, the second pressure-sensitive switch SW21 is located at the end, the third pressure-sensitive switch group includes the second specific pressure-sensitive switch on the side identical to the side where the second pressure-sensitive switch group is located with respect to the first specific pressure-sensitive switch, and at least one first pressure-sensitive switch SW13 and at least one second pressure-sensitive switch SW21, SW23 are disposed adjacent to each other along the front-rear direction of the seat SE.

With such a configuration, the first pressure-sensitive switches SW11 and SW12 and the second pressure-sensitive switch SW22 of the second pressure-sensitive switch group, and the second pressure-sensitive switches SW21 and SW23 and the first pressure-sensitive switch SW13 of the third pressure-sensitive switch group are disposed in parallel. This can further increase sitting detection sensitivity even when the occupant sits so as to be displaced in the left-right direction of the seat. This will be described with reference to FIG. 10. In FIG. 10, similarly to FIG. 5, the region ST1 to which the load is applied on the seat SE when the occupant sits at the normal position is indicated by a broken line, the region ST2 to which the load is applied on the seat SE when the occupant sits at forward position is indicated by a chain line, and regions ST3 and ST4 to which the load is applied on the seat SE when the occupant sits so as to be displaced in the left-right direction are indicated by dotted lines. As shown in FIG. 10, in the sitting sensor 1, when the occupant sits at the forward position, the first pressure-sensitive switch SW11 and the second pressure-sensitive switch SW21 disposed on the first belt and disposed along the left-right direction of the seat SE can be simultaneously turned on. Further, in the sitting sensor 1, when the occupant sits so as to be displaced toward the first side in the left-right direction, either the first pressure-sensitive switch SW11, SW12 disposed on the second belt and disposed along the front-rear direction of the seat SE, and the second pressure-sensitive switch SW22 can be simultaneously turned on. Further, in the sitting sensor 1, when the occupant sits so as to be displaced toward the second side in the left-right direction, either the second pressure-sensitive switch SW21, SW23 and the first pressure-sensitive switch SW13 disposed in the third belt and disposed along the front-rear direction of the seat SE can be simultaneously turned on. The sitting sensor 1 according to the present embodiment can therefore detect the sitting more appropriately.

Further, in the present embodiment, the second specific pressure-sensitive switch is the second pressure-sensitive switch SW21. As mentioned above, the first specific pressure-sensitive switch is the first pressure-sensitive switch SW11. Consequently, of the pressure-sensitive switches of the second pressure-sensitive switch group and the pressure-sensitive switches of the third pressure-sensitive switch group, the first pressure-sensitive switch SW12 and the second pressure-sensitive switch SW23 are easily arranged in the left-right direction of the seat SE, and the second pressure-sensitive switch SW22 and the first pressure-sensitive switch SW13 are easily arranged in the left-right direction of the seat SE. As a result, when the load is applied along the left-right direction of the seat SE, the first pressure-sensitive switch and the second pressure-sensitive switch are easily turned on, and the sitting detection sensitivity can be further increased.

Further, in the present embodiment, the set of one first pressure-sensitive switch SW12 of the second pressure-sensitive switch group and one second pressure-sensitive switch SW23 of the third pressure-sensitive switch group overlaps the straight line L6 along the left-right direction of the seat SE. The set of one second pressure-sensitive switch SW22 of the second pressure-sensitive switch group and one first pressure-sensitive switch SW13 of the third pressure-sensitive switch group overlaps another straight line L5 along the left-right direction of the seat SE. As a result, when the load is applied along the left-right direction of the seat SE, the first pressure-sensitive switch and the second pressure-sensitive switch are more easily turned on, and the sitting detection sensitivity can be further increased.

Further, the present embodiment has the third belt 3B overlapping the second pressure-sensitive switches SW21 and SW23 and the first pressure-sensitive switch SW13, which are all the pressure-sensitive switches of the third pressure-sensitive switch group, and extending along the front-rear direction of the seat SE. Thus, even when a stress is applied to the sitting sensor 1 in such a direction that the second pressure-sensitive switch SW21, the second pressure-sensitive switch SW23, and the first pressure-sensitive switch SW13 of the third pressure-sensitive switch group are separated from each other due to the sitting, the third belt 3B, which extends along the front-rear direction of the seat, prevents these pressure-sensitive switches from being separated from each other. This can further suppress the relative displacement of the pressure-sensitive switches.

Further, in the present embodiment, the second pressure-sensitive switches SW21 and SW23 and the first pressure-sensitive switch SW13 of the third pressure-sensitive switch group are disposed to be displaced from each other in the left-right direction of the seat SE. The third wiring is disposed between the third straight line L3 extending in the front-rear direction of the seat SE through the end on the first side of the second pressure-sensitive switches SW21 and SW23 disposed to be displaced farthest to the first side in the left-right direction of the seat SE in the third pressure-sensitive switch group, and the fourth straight line L4 that passes the end on the second side of the first pressure-sensitive switch SW13 disposed to be displaced farthest to the second side in the left-right direction of the seat SE in the third pressure-sensitive switch group and is parallel to the third straight line L3.

If the second pressure-sensitive switches SW21 and SW23 and the first pressure-sensitive switch SW13 of the third pressure-sensitive switch group are disposed in a row along the front-rear direction of the seat SE without a displacement in the left-right direction, for example, if the wiring 15F connected to the second pressure-sensitive switch SW21 bypasses the first pressure-sensitive switch SW13 and extends, the wiring 15F would have to rise in the left-right direction of the seat SE and extend along the first pressure-sensitive switch SW13. However, in the sitting sensor 1 according to the present embodiment, although the wiring 15F as the third wiring connected to the second pressure-sensitive switches SW21 and SW23, which are displaced toward the first side in the left-right direction of the seat SE, bypasses the first pressure-sensitive switch SW13 displaced toward the second side in the left-right direction of the seat SE, the wiring 15F can be linearly disposed. This can simplify a wiring design.

Further, in the sitting sensor 1 according to the present embodiment, the distance between the second belt 2B and the third belt 3B is larger than the width of the second belt 2B and the width of the third belt 3B. Consequently, the distance between the second belt 2B and the third belt 3B is as large as or larger than one or more pressure-sensitive switch. This can prevent the pressure-sensitive switches on the second belt 2B and the pressure-sensitive switches on the third belt 3B from coming too close to each other, prevent the pressure-sensitive switches on the second belt 2B and the pressure-sensitive switches on the third belt 3B from being both turned on when a luggage is placed, and thus prevent the placed luggage from being erroneously detected as sitting by the occupant. Further, for mass-production of the sitting sensor, a large number of the above insulating sheets are preferably imposed onto one insulating sheet. Then, as described with reference to FIG. 11, the sitting sensor 1 according to the present embodiment can be imposed such that the second belt or the third belt of another sitting sensor 1 is located between the second belt 2B and the third belt 3B of the sitting sensor 1. The above configuration makes the sitting sensor suitable for mass production.

Further, in the sitting sensor 1 according to the present embodiment, the number of pressure-sensitive switches of the second pressure-sensitive switch group and the number of pressure-sensitive switches of the third pressure-sensitive switch group are larger than that of the pressure-sensitive switches of the first pressure-sensitive switch group. As described above, the occupant sitting on the seat SE generally tends to sit so as to be displaced in the front-rear direction of the seat rather than in the left-right direction of the seat. Therefore, because the number of pressure-sensitive switches of the second pressure-sensitive switch group and the number of the pressure-sensitive switches of the third pressure-sensitive switch group are larger than the number of pressure-sensitive switches of the first pressure-sensitive switch group similarly in the sitting sensor 1 according to the present embodiment, even if the occupant sits to be displaced in the front-rear direction of the seat SE, the sitting can be detected more appropriately. Unlike in the present embodiment, only one of the number of pressure-sensitive switches of the second pressure-sensitive switch group or the number of pressure-sensitive switches of the third pressure-sensitive switch group may be larger than the number of the pressure-sensitive switches in the first pressure-sensitive switch group.

Although the sitting sensor of the present invention has been described above by taking the above embodiment as an example, the present invention is not limited to the above embodiment.

For example, in the above embodiment, one first pressure-sensitive switch SW11 and one second pressure-sensitive switch SW21 are disposed to overlap the first line segment LS1 on the first belt 1B. However, as long as the first pressure-sensitive switch and the second pressure-sensitive switch are disposed adjacent to each other to overlap the first line segment LS1 on the first belt 1B, three or more pressure-sensitive switches may be disposed. That is, the first pressure-sensitive switch group may have three or more pressure-sensitive switches. Therefore, when the first specific pressure-sensitive switch is the first pressure-sensitive switch SW11 as in the above embodiment and an odd number of pressure-sensitive switches are disposed to overlap the first line segment LS1, the second specific pressure-sensitive switch is the first pressure-sensitive switch.

Further, in the above embodiment, the two first pressure-sensitive switches SW11 and SW12 and the one second pressure-sensitive switch SW22 are disposed along the front-rear direction of the seat SE on the second belt 2B. However, as long as the first pressure-sensitive switch and the second pressure-sensitive switch are disposed adjacent to each other along the front-rear direction of the seat SE on the second belt 2B, two pressure-sensitive switches may be disposed, or four or more pressure-sensitive switches may be disposed. Similarly, in the above embodiment, two second pressure-sensitive switches SW21 and SW23 and one first pressure-sensitive switch SW13 are disposed along the front-rear direction of the seat SE on the third belt 3B. However, as long as the first pressure-sensitive switch and the second pressure-sensitive switch are disposed adjacent to each other along the front-rear direction of the seat SE on the third belt 3B, two pressure-sensitive switches may be disposed, or four or more pressure-sensitive switches may be disposed.

Figure 12:
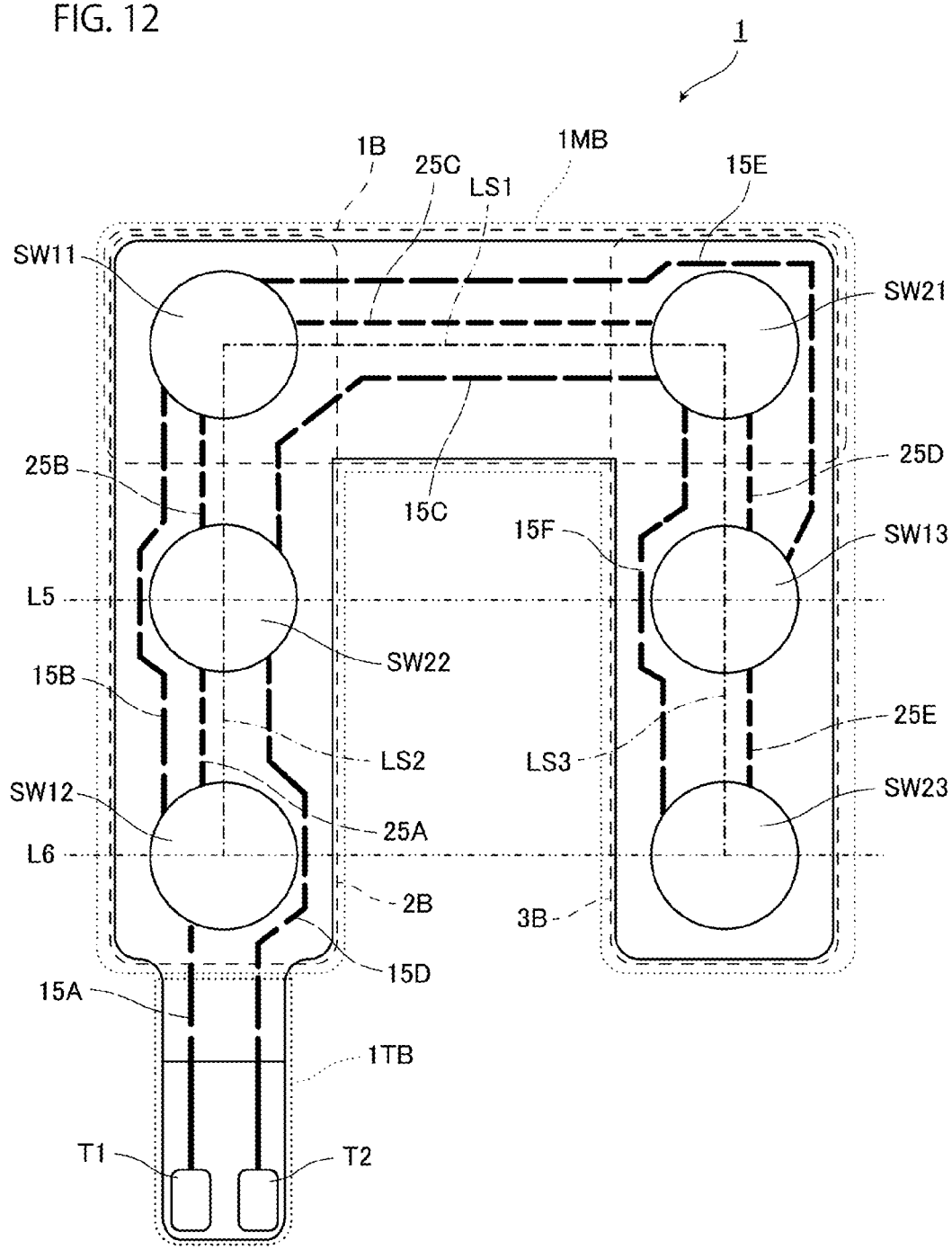
FIG. 12 is a plan view of a sitting sensor in a modification in which pressure-sensitive switches are linearly disposed.

Further, in the above embodiment, the first pressure-sensitive switch SW11 and the second pressure-sensitive switch SW21 of the first pressure-sensitive switch group are disposed to be displaced from each other in the front-rear direction of the seat SE. However, the pressure-sensitive switches of the first pressure-sensitive switch group may be linearly disposed along the left-right direction of the seat SE. Similarly, in the above embodiment, the first pressure-sensitive switches SW11 and SW12 and the second pressure-sensitive switch SW22 of the second pressure-sensitive switch group are disposed to be displaced from each other in the left-right direction of the seat SE. However, the pressure-sensitive switches of the second pressure-sensitive switch group may be linearly disposed along the front-rear direction of the seat SE. Similarly, in the above embodiment, the second pressure-sensitive switches SW21 and SW23 and the first pressure-sensitive switch SW13 of the third pressure-sensitive switch group are disposed to be displaced from each other in the left-right direction of the seat SE. However, the pressure-sensitive switches of the third pressure-sensitive switch group may be linearly disposed along the front-rear direction of the seat SE. FIG. 12 is a plan view of a sitting sensor in a modification in which pressure-sensitive switches are linearly disposed. In this modification, the first pressure-sensitive switch SW11 and the second pressure-sensitive switch SW21 overlapping the first line segment LS1 are not displaced from each other in the direction perpendicular to the first line segment LS1. With such a configuration, as described above, the pressure-sensitive switches of the first pressure-sensitive switch group can be linearly disposed along the left-right direction of the seat SE. Further, in this modification, the first pressure-sensitive switches SW11 and SW12 and the second pressure-sensitive switch SW22 overlapping the second line segment LS2 are not displaced from each other in the direction perpendicular to the second line segment LS2. With such a configuration, as described above, the pressure-sensitive switches of the second pressure-sensitive switch group can be linearly disposed along the front-rear direction of the seat SE. Further, in this modification, the first pressure-sensitive switch SW13 and the second pressure-sensitive switches SW21 and SW23 overlapping the third line segment LS3 are not displaced from each other in the direction perpendicular to the third line segment LS3. With such a configuration, as described above, the pressure-sensitive switches of the third pressure-sensitive switch group can be linearly disposed along the front-rear direction of the seat SE.

In the above embodiment, the distance between the second belt 2B and the third belt 3B is larger than the width of the second belt 2B and the width of the third belt 3B. However, the distance between the second belt 2B and the third belt 3B may be less than or equal to the width of the second belt 2B and the width of the third belt 3B.

Further, each pressure-sensitive switch of the first pressure-sensitive switch group does not have to overlap the first line segment LS1 as long as each pressure-sensitive switch of the first pressure-sensitive switch group is disposed along the left-right direction of the seat SE. Similarly, each pressure-sensitive switch of the second pressure-sensitive switch group does not have to overlap the second line segment LS2 as long as each pressure-sensitive switch of the second pressure-sensitive switch group is disposed along the front-rear direction of the seat SE, and each pressure-sensitive switch of the third pressure-sensitive switch group does not have to overlap the third line segment LS3 as long as each pressure-sensitive switch of the third pressure-sensitive switch group is disposed along the front-rear direction of the seat SE.

Further, in the above embodiment, each pressure-sensitive switch of the first pressure-sensitive switch group is disposed along the left-right direction of the seat SE, each pressure-sensitive switch except for the first specific pressure-sensitive switch in the second pressure-sensitive switch group is disposed at a rear part of the seat SE with respect to the first pressure-sensitive switch group. However, each pressure-sensitive switch except for the first specific pressure-sensitive switch of the second pressure-sensitive switch group may be disposed at the front part of the seat SE with respect to the first pressure-sensitive switch group. Further, each pressure-sensitive switch except for the second specific pressure-sensitive switch of the third pressure-sensitive switch group is disposed at the rear part of the seat SE with respect to the first pressure-sensitive switch group. However, each pressure-sensitive switch of the third pressure-sensitive switch group except for the second specific pressure-sensitive switch may be disposed at the front part of the seat SE with respect to the first pressure-sensitive switch group. As in these cases, when the first specific pressure-sensitive switch of the second pressure-sensitive switch group is located at a rearmost position or when the second specific pressure-sensitive switch of the third pressure-sensitive switch group is located at the rearmost position, the first pressure-sensitive switch group including at least one first pressure-sensitive switch and at least one second pressure-sensitive switch is disposed at a rear part of the seat along the left-right direction. Thus, for example, when the occupant sits with the buttocks displaced rearward from the normal position, the first pressure-sensitive switch SW11 and the second pressure-sensitive switch SW21 of the first pressure-sensitive switch group can be simultaneously turned on. Consequently, when the first pressure-sensitive switch group is disposed behind the seat, sitting can be appropriately detected.

Further, in the above embodiment, the sitting sensor 1 is disposed at the rear part of the seat SE with respect to the groove GR. However, the sitting sensor 1 may be disposed at the front part of the seat SE with respect to the groove GR. Further, in the above embodiment, the groove GR is formed in the seat SE. However, the groove GR may not be formed in the seat SE in which the sitting sensor 1 is disposed. Therefore, a position where the sitting sensor 1 is disposed in the seat SE is not limited to the above embodiment as long as the first pressure-sensitive switch group is disposed along the left-right direction of the seat SE, and the second pressure-sensitive switch group and the third pressure-sensitive switch group are disposed along the front-rear direction of the seat SE.

Further, in the above embodiment, the tail block 1TB is connected to the second belt 2B. However, a part to which the tail block 1TB is connected is not limited. For example, the tail block 1TB may be connected to the first belt 1B or the third belt 3B.

Figure 13:
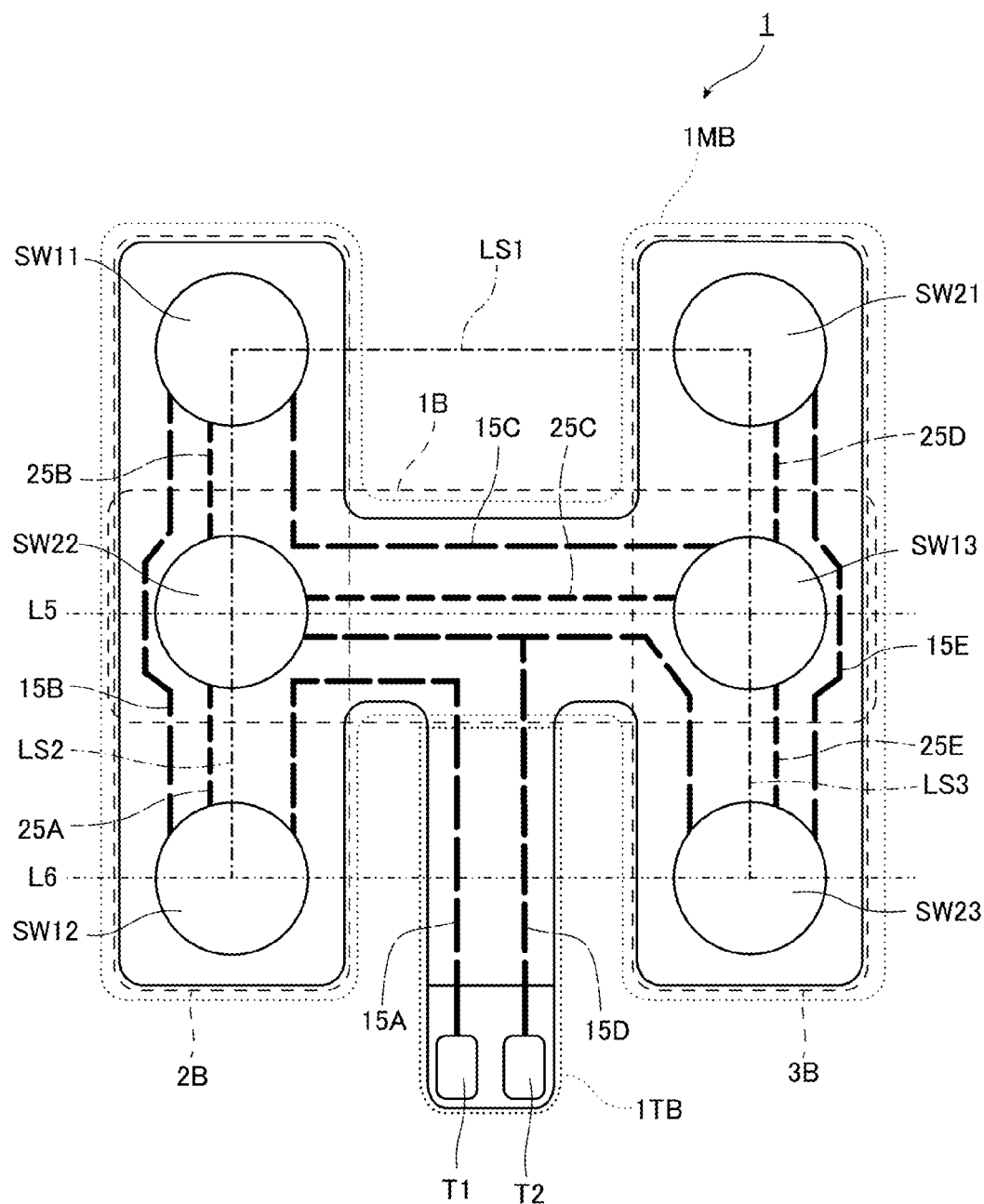
FIG. 13 is a plan view of a sitting sensor according to a modification having a substantially H-shape.

Further, in the first embodiment, the sitting sensor 1 has a substantially L-shape, and in the second embodiment, the sitting sensor 1 has a substantially U-shape. However, the shape of the sitting sensor is not limited. For example, as shown in FIG. 13, the sitting sensor 1 may have a substantially H-shape. FIG. 13 is a plan view of a sitting sensor according to a modification having a substantially H-shape. In the present modification, the second pressure-sensitive switch SW22 of the second pressure-sensitive switch group is disposed in a region where the first belt 1B and the second belt 2B share. Further, the first pressure-sensitive switch SW13 of the third switch group is disposed in a region where the first belt 1B and the third belt 3B share. Further, the tail block 1TB is connected to substantially a center in a direction in which the first belt 1B extends, and extends in a direction identical to the direction in which the second belt 2B and the third belt 3B extend. Then, the sitting sensor 1 according to the present modification has a substantially symmetrical shape with respect to the direction perpendicular to the first line segment LS1. That is, the sitting sensor 1 according to the present modification has a substantially laterally symmetrical shape when disposed in the seat SE as in the second embodiment. Such a sitting sensor 1 having the laterally symmetrical shape can improve productivity of the sitting sensor 1.

Further, in the present modification, when the sitting sensor 1 is disposed in the seat SE as in the second embodiment, the second belt 2B and the third belt 3B extend in the front-rear direction of the seat SE. Then, a first end of the first belt 1B is connected to the second belt 2B, and a second end of the first belt 1B is connected to the third belt 3B. Thus, the first insulating sheet 10P and the second insulating sheet 20P according to the present modification have the first belts 11B and 21B, the second belts 12B and 22B that overlap the first pressure-sensitive switches SW11 and SW12 and the second pressure-sensitive switch SW22 as all the pressure-sensitive switches of the second pressure-sensitive switch group and extend along the front-rear direction of the seat SE, and the third belts 13B and 23B that overlap the second pressure-sensitive switches SW21 and SW23 and the first pressure-sensitive switch SW13 as all the pressure-sensitive switches of the third pressure-sensitive switch group and extend along the front-rear direction of the seat SE. The first ends of the first belts 11B and 21B and the second belts 12B and 22B are connected to each other, and the second ends of the first belts 11B and 21B and the third belts 13B and 23B are connected to each other. Consequently, even when a stress is applied in such a direction that the first pressure-sensitive switches SW11 and SW12 and the second pressure-sensitive switch SW22 of the second pressure-sensitive switch group are separated from each other due to sitting by the occupant, the second belts 12B and 22B, which extend along the front-rear direction of the seat SE, prevent the first pressure-sensitive switches SW11 and SW12 and the second pressure-sensitive switch SW22 of the second pressure-sensitive switch group from being separated from each other. Further, even when a stress is applied in such a direction that the second pressure-sensitive switches SW21 and SW23 and the first pressure-sensitive switch SW13 of the third pressure-sensitive switch group are separated from each other due to sitting, the third belts 13B and 23B, which extend along the front-rear direction of the seat SE, prevent the second pressure-sensitive switches SW21 and SW23 and the first pressure-sensitive switch SW13 of the third pressure-sensitive switch group from being separated from each other. This suppresses a relative displacement of the pressure-sensitive switches.

In the sitting sensor 1 according to the present modification, the first terminal T1 and the first electrode 12F are electrically connected by the wiring 15A, the first electrode 12F and the first electrode 11F are electrically connected by the wiring 15B, the first electrode 11F and the first electrode 13F are electrically connected by the wiring 15C, the second electrode 21F and the second electrode 23F are electrically connected by the wiring 15E, and the second electrode 22F, the second electrode 23F, and the second terminal T2 are electrically connected by the wiring 15D. Further, the first electrode 12S and the second electrode 22S are electrically connected by the wiring 25A, the second electrode 22S and the first electrode 11S are electrically connected by the wiring 25B, the second electrode 22S and the first electrode 13S are electrically connected by the wiring 25C, the first electrode 13S and the second electrode 21S are electrically connected by the wiring 25D, and the first electrode 13S and the second electrode 23S are electrically connected by the wiring 25E. Further, in the sitting sensor 1 according to the present modification, an end of the tail block 1TB opposite to a side of the first belt 1B protrudes from ends of the second belt 2B and the third belt 3B where the tail block 1TB is located, toward the side opposite to the side of the first belt 1B and the terminals T1 and T2 are disposed in this protruding part. However, the end of the tail block 1TB opposite to the side of the first belt 1B does not have to protrude from the ends of the second belt 2B and the third belt 3B where the tail block 1TB is located toward the side opposite to the side of the first belt 1B.

Although not shown in the drawings, the sitting sensor 1 may have a substantially annular or polygonal annular shape. For example, the sitting sensor 1 according to the second embodiment shown in FIG. 7 may be further provided with a fourth belt extending in a direction identical to the direction in which the first belt 1B extends, from the end of the second belt 2B opposite to the side of the first belt 1B to the end of the third belt 3B opposite to the side of the first belt 1B. This configuration forms the sitting sensor 1 in a substantially rectangular annular shape. In this case, the first pressure-sensitive switch SW12 of the second pressure-sensitive switch group can be disposed in a region where the second belt 2B and the fourth belt share, and the second pressure-sensitive switch SW23 of the third pressure-sensitive switch group can be disposed in a region where the third belt 3B and the fourth belt share.

REFERENCE SIGNS LIST

1 . . . sitting sensor
1B . . . first belt
2B . . . second belt
3B . . . third belt
10 . . . first electrode sheet
11B . . . first belt
12B . . . second belt
13B . . . third belt
10p . . . first insulating sheet
11F, 12F, 13F . . . first electrode
11S, 12S, 13S . . . first electrode
15A to 15F . . . wiring
20 . . . second electrode sheet
21B . . . first belt
22B . . . second belt
23B . . . third belt
20P . . . second insulating sheet
21F, 22F, 23F . . . second electrode
21S, 22S, 23S . . . second electrode
25A to 25E . . . wiring
30 . . . spacer
11H, 12H, 13H, 21H, 22H, 23H . . . opening
LS1 . . . first line segment
LS2 . . . second line segment
LS3 . . . third line segment
SW11, SW12, SW13 . . . first pressure-sensitive switch
SW21, SW22, SW23 . . . second pressure-sensitive switch
T1, T2 . . . terminal

The invention claimed is:

1. A sitting sensor comprising:
a pair of insulating sheets;
a spacer disposed between the pair of insulating sheets and having a plurality of openings;
a plurality of pressure-sensitive switches including a pair of electrodes facing each other at the plurality of openings; and
a pair of terminals,
wherein the plurality of pressure-sensitive switches is configured by at least one first pressure-sensitive switch including one first specific pressure-sensitive switch and at least two second pressure-sensitive switches, and has a first pressure-sensitive switch group including the at least one first pressure-sensitive switch including the one first specific pressure-sensitive switch and at least one second pressure-sensitive switch of the at least two second pressure-sensitive switches, and a second pressure-sensitive switch group including the at least one first pressure-sensitive switch including the first specific pressure-sensitive switch and at least one second pressure-sensitive switch of the at least two second pressure-sensitive switches that is different from the at least one second pressure-sensitive switch included in the first pressure-sensitive switch group,
in the first pressure-sensitive switch group, the first specific pressure-sensitive switch is located at an end of the first pressure-sensitive switch group, and the one first specific pressure-sensitive switch and the at least one second pressure-sensitive switch are adjacent to each other along a left-right direction of a seat,
in the second pressure-sensitive switch group, the first specific pressure-sensitive switch is located at an end of the second pressure-sensitive switch group, and the one first specific pressure-sensitive switch and the at least one second pressure-sensitive switch are adjacent to each other along a front-rear direction of the seat, turning on the at least one first pressure-sensitive switch and the at least one second pressure-sensitive switch causes a current to flow between the pair of terminals, and the at least one first pressure-sensitive switch and the at least one second pressure-sensitive switch are connected in series.

2. The sitting sensor according to claim 1,
wherein a number of the plurality of pressure-sensitive switches of the second pressure-sensitive switch group is larger than a number of the plurality of pressure-sensitive switches of the first pressure-sensitive switch group.

3. The sitting sensor according to claim 1,
wherein the number of the pressure-sensitive switches of the first pressure-sensitive switch group is two.

4. The sitting sensor according to claim 1,
wherein the pair of insulating sheets has a first belt that overlaps all the pressure-sensitive switches of the first pressure-sensitive switch group and extends along the left-right direction of the seat, and a second belt that overlaps all the pressure-sensitive switches of the second pressure-sensitive switch group and extends along the front-rear direction of the seat.

5. The sitting sensor according to claim 4, further comprising:
a first wiring connected to at least one of the pressure-sensitive switches of the first pressure-sensitive switch group and disposed between the pair of insulating sheets on the first belt; and
a second wiring connected to at least one of the pressure-sensitive switches of the second pressure-sensitive switch group and disposed between the pair of insulating sheets on the second belt,
wherein of the pressure-sensitive switches of the second pressure-sensitive switch group, the at least one first pressure-sensitive switch and the at least one second pressure-sensitive switch are disposed to be displaced from each other in the left-right direction of the seat, and
the second wiring is disposed between a first straight line extending in the front-rear direction of the seat through an end on a first side of a pressure-sensitive switch disposed to be displaced farthest to the first side in the left-right direction of the seat in the second pressure-sensitive switch group, and a second straight line that passes an end on a second side of a pressure-sensitive switch disposed to be displaced farthest to the second side in the left-right direction of the seat in the second pressure-sensitive switch group and is parallel to the first straight line.

6. The sitting sensor according to claim 1,
wherein, in the first pressure-sensitive switch group, the pressure-sensitive switch located at an end opposite to the first specific pressure-sensitive switch is a second specific pressure-sensitive switch, and
the plurality of pressure-sensitive switches further includes a third pressure-sensitive switch group in which the second specific pressure-sensitive switch is located at an end of the third pressure-sensitive switch group, the second specific pressure-sensitive switch is included on a side identical to a side where the second pressure-sensitive switch group is located with respect to the first specific pressure-sensitive switch, and the at least one first pressure-sensitive switch and the at least one second pressure-sensitive switch are disposed adjacent to each other along the front-rear direction of the seat.

7. The sitting sensor according to claim 6,
wherein at least one of a number of the plurality of the pressure-sensitive switches of the second pressure-sensitive switch group or a number of the plurality of the pressure-sensitive switches of the third pressure-sensitive switch group is larger than a number of the plurality of the pressure-sensitive switches of the first pressure-sensitive switch group.

8. The sitting sensor according to claim 6,
wherein the second specific pressure-sensitive switch is the at least two second pressure-sensitive switches.

9. The sitting sensor according to claim 8,
wherein a set of the at least one first pressure-sensitive switch of the second pressure-sensitive switch group and the at least one second pressure-sensitive switch of the third pressure-sensitive switch group overlaps a straight line along the left-right direction of the seat, and
the set of the at least one second pressure-sensitive switch of the second pressure-sensitive switch group and the at least one first pressure-sensitive switch of the third pressure-sensitive switch group overlaps another straight line along the left-right direction of the seat.

10. The sitting sensor according to claim 6,
wherein the pair of insulating sheets has a first belt, a second belt that overlaps all the pressure-sensitive switches of the second pressure-sensitive switch group and extends along the front-rear direction of the seat, and a third belt that overlaps all the pressure-sensitive switches of the third pressure-sensitive switch group and extends along the front-rear direction of the seat, and
the first belt has a first end connected to the second belt, and a second end connected to the third belt.

11. The sitting sensor according to claim 10,
wherein the first belt overlaps all the pressure-sensitive switches of the first pressure-sensitive switch group and extends along the left-right direction of the seat.

12. The sitting sensor according to claim 10,
wherein a distance between the second belt and the third belt is larger than a width of the second belt and a width of the third belt.

13. The sitting sensor according to claim 10, further comprising:
a first wiring disposed between the insulating sheets on the first belt, and connected to at least one of the pressure-sensitive switches of the first pressure-sensitive switch group;
a second wiring disposed between the insulating sheets on the second belt, and connected to at least one of the pressure-sensitive switches of the second pressure-sensitive switch group; and
a third wiring disposed between the insulating sheets on the third belt, and connected to at least one of the pressure-sensitive switches of the third pressure-sensitive switch group,
wherein of the pressure-sensitive switches of the second pressure-sensitive switch group, the at least one first pressure-sensitive switch and the at least one second pressure-sensitive switch are disposed to be displaced from each other in the left-right direction of the seat,
of the pressure-sensitive switches of the third pressure-sensitive switch group, the at least one first pressure-sensitive switch and the at least one second pressure-sensitive switch are disposed to be displaced from each other in the left-right direction of the seat, the second wiring is disposed between a first straight line extending in the front-rear direction of the seat through an end on a first side of a pressure-sensitive switch disposed to be displaced farthest to the first side in the left-right direction of the seat in the second pressure-sensitive switch group, and a second straight line that passes an end on a second side of the pressure-sensitive switch disposed to be displaced farthest to the second side in the left-right direction of the seat in the second pressure-sensitive switch group and is parallel to the first straight line, and the third wiring is disposed between a third straight line extending in the front-rear direction of the seat through an end on a first side of a pressure-sensitive switch disposed to be displaced farthest to the first side in the left-right direction of the seat in the third pressure-sensitive switch group, and a fourth straight line that passes an end on a second side of the pressure-sensitive switch disposed to be displaced farthest to the second side in the left-right direction of the seat in the third pressure-sensitive switch group and is parallel to the third straight line.

14. A sitting sensor comprising:

a pair of insulating sheets;

a spacer disposed between the pair of insulating sheets and having a plurality of openings;

a plurality of pressure-sensitive switches including a pair of electrodes facing each other at the plurality of openings; and a pair of terminals, wherein the plurality of pressure-sensitive switches is configured by at least one first pressure-sensitive switch including one first specific pressure-sensitive switch and at least two second pressure-sensitive switches, and has a first pressure-sensitive switch group including the at least one first pressure-sensitive switch including the one first specific pressure-sensitive switch and at least one second pressure-sensitive switch of the at least two second pressure-sensitive switches, and a second pressure-sensitive switch group including the at least one first pressure-sensitive switch including the first specific pressure-sensitive switch and at least one second pressure-sensitive switch of the at least two second pressure-sensitive switches that is different from the at least one second pressure-sensitive switch included in the first pressure-sensitive switch group, in the first pressure-sensitive switch group, the first specific pressure-sensitive switch is located at an end of the first pressure-sensitive switch group, and the one first specific pressure-sensitive switch and the at least one second pressure-sensitive switch are adjacent to each other along a left-right direction of a seat, in the second pressure-sensitive switch group, the first specific pressure-sensitive switch is located at an end of the second pressure-sensitive switch group, and the one first specific pressure-sensitive switch and the at least one second pressure-sensitive switch are adjacent to each other along a front-rear direction of the seat, turning on the at least one first pressure-sensitive switch and the at least one second pressure-sensitive switch causes a current to flow between the pair of terminals, wherein, in the first pressure-sensitive switch group, the pressure-sensitive switch located at an end opposite to the first specific pressure-sensitive switch is a second specific pressure-sensitive switch, and the plurality of pressure-sensitive switches further includes a third pressure-sensitive switch group in which the second specific pressure-sensitive switch is located at an end of the third pressure-sensitive switch group, the second specific pressure-sensitive switch is included on a side identical to a side where the second pressure-sensitive switch group is located with respect to the first specific pressure-sensitive switch, and the at least one first pressure-sensitive switch and the at least one second pressure-sensitive switch are disposed adjacent to each other along the front-rear direction of the seat.

* * * * *